US006771476B2

(12) United States Patent
Fukuoka et al.

(10) Patent No.: US 6,771,476 B2
(45) Date of Patent: Aug. 3, 2004

(54) CIRCUIT PROTECTOR

(75) Inventors: Michio Fukuoka, Miyazaki (JP); Kenichi Hasegawa, Miyazaki (JP); Yasuki Nagatomo, Miyazaki (JP); Eizo Hatanaka, Miyazaki (JP); Hideyuki Tokada, Miyazaki (JP); Toshiyuki Iwao, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 135 days.

(21) Appl. No.: 10/032,861

(22) Filed: Dec. 27, 2001

(65) Prior Publication Data

US 2002/0097547 A1 Jul. 25, 2002

(30) Foreign Application Priority Data

Dec. 27, 2000 (JP) ....................................... 2000-397685
Dec. 27, 2000 (JP) ....................................... 2000-397686
Jun. 18, 2001 (JP) ....................................... 2001-183173

(51) Int. Cl.[7] .................................................. H02H 5/04
(52) U.S. Cl. ..................... 361/103; 361/306.2; 332/297
(58) Field of Search ................................ 361/103, 104, 361/306.2, 763; 332/297, 248

(56) References Cited

U.S. PATENT DOCUMENTS 5,621,375 A * 4/1997 Gurevich .................... 337/297
5,664,320 A * 9/1997 Gurevich ..................... 29/623
5,726,621 A * 3/1998 Whitney et al. ............ 337/297
5,774,037 A * 6/1998 Gurevich .................... 337/248

FOREIGN PATENT DOCUMENTS

| | | |
|---|---|---|
| JP | 49-130345 | 3/1973 |
| JP | 56-32402 | 8/1977 |
| JP | 53-15556 | 2/1978 |
| JP | 56-22601 | 5/1981 |
| JP | 58-38988 | 9/1983 |
| JP | 01-228101 | 9/1989 |
| JP | 2-5326 | 1/1990 |
| JP | 2-43701 | 2/1990 |
| JP | 3-201504 | 9/1991 |
| JP | 5-120985 | 5/1993 |
| JP | 7-23921 | 5/1995 |
| JP | 10-284307 | 10/1998 |
| JP | 11-3820 | 1/1999 |
| JP | 11-111504 | 4/1999 |
| JP | 2001-23502 | 1/2001 |
| JP | 2001-143599 | 5/2001 |

OTHER PUBLICATIONS

Japanese Office Action for patent application No. 1999–188746 dated Apr. 25, 2002.
Japanese Office Action for patent application No. 1999–188746 dated Aug. 7, 2002.
Japanese Office Action for patent application No. 2000–397685 dated Apr. 25, 2002.

(List continued on next page.)

*Primary Examiner*—Bao Q. Vu
(74) *Attorney, Agent, or Firm*—RatnerPrestia

(57) ABSTRACT

A circuit protector comprising a substrate, a conductive layer formed around the substrate, a narrowed portion formed on the conductive layer at a certain part, terminals formed at both ends of the substrate. The substrate has 1–30% pores in a unit surface area in a vicinity of its surface. The present invention also relates to a mounting structure of the circuit protector onto a circuit board.

28 Claims, 19 Drawing Sheets

OTHER PUBLICATIONS

Japanese Office Action for patent application No. 2000–397685 dated Aug. 8, 2002.
Japanese Office Action for patent application No. 2000–397686 dated Apr. 25, 2002.
Japanese Office Action for patent application No. 2000–397686 dated Aug. 9, 2002.
Japanese Office Action for patent application No. 2001–183173 dated Apr. 25, 2002.
Japanese Office Action for patent application No. 2000–164299 dated Apr. 30, 2002.
Japanese Office Action for patent application No. 2000–164299 dated Aug. 8, 2002.

* cited by examiner

11 Substrate
12 Conductive layer
13 Groove
14 Protective material

11 Substrate
12 Conductive layer
13 Groove
14 Protective material

11 Substrate
12 Conductive layer
13 Groove
14 Protective material

CIRCUIT PROTECTOR

FIELD OF THE INVENTION

The present invention relates to a circuit protection device for use in an electronic apparatus, a battery-driven mobile electronic apparatus, etc.; more specifically, those circuit protection devices used in memory devices such as hard disk drives, optical disk drives built in personal computers or mobile personal computers.

BACKGROUND OF THE INVENTION

Some of the circuit protection devices (hereinafter referred to as circuit protector) for protecting a circuit board or the like apparatus from an over current have been disclosed in, for example, Japanese Laid-open Patent Publications No. H02-43701, No. H05-120985, No. H03-201504 and so on. Along with the increasing popularity of downsized electronic apparatus, the demand is increasing for components of smaller dimensions. At the same time, requirements in characteristics of such components are becoming more stringent.

A circuit protector disclosed in the Publication No. H02-43701 has an alumina substrate of flat sheet form provided with a nickel layer formed on the upper surface. The nickel layer is trimmed by a laser beam to form a narrowed portion. The electric current concentrates to the narrowed portion, which melts down upon an over current.

In the circuit protectors of the above structure, the heat expected to concentrate to the narrowed portion easily diffuses through the substrate, since alumina substrate has a high thermal conduction coefficient. The heat escapes to wiring of a circuit board through terminals of a circuit protector. As a result, fusing characteristics of a circuit protector tends to fluctuate depending on various conditions such as wiring arrangement in the relevant circuit board, etc.

Thus, the conventional circuit protectors are not capable of controlling the heat diffusion to a circuit board effectively. As a result, the pre-arcing time-current characteristics (hereinafter referred to as "characteristics") and other performance items remain out of a stringent control.

A circuit protector disclosed in the Publication No. H05-120985 has a pair of conductive portions provided on an insulating substrate, and a fuse member is formed between the pair of conductive portions. The fuse member is covered with a JCR coating, which is further covered with a resin mold.

The above-described structure is complicated and needs an increased number of process steps. The problem on top of it is that dispersion in the characteristics is relatively wide.

Further, the Publication No. H03-201504 discloses a fuse resistor provided with a melt down portion between two terminals. The melt down portion is made by narrowing a resistor film by two end portions of not continuous grooves.

The structure has a problem of wide deviation of characteristics, or pre-arcing times.

SUMMARY OF THE INVENTION

A circuit protector of the present invention comprises a substrate, a conductive layer formed around the substrate, a narrowed portion formed on the conductive layer at a certain part, terminals formed at both ends of the substrate. The substrate has 1–30% pores in a unit surface area in a vicinity of its surface. The present invention also relates to a structure relating to the mounting circuit protectors on a circuit board.

BRIEF DESCRIPTION OF THE DRAWINGS

FIG. 3(*b*) is a partial magnification of FIG. 3.

FIG. 3(*c*) is a partial magnification of FIG. 3.

FIG. 8(*b*) is a partial magnification of FIG. 8.

FIG. 20(*b*) is a cross sectional view of other terminal in an exemplary embodiment of the present invention.

FIG. 20(*c*) is a cross sectional view of other terminal in an exemplary embodiment of the present invention.

FIG. 21(*b*) is a perspective view of other circuit protector in an exemplary embodiment of the present invention.

FIG. 21(*c*) is a perspective view of other circuit protector in an exemplary embodiment of the present invention.

FIG. 21(*d*) is a perspective view of other circuit protector in an exemplary embodiment of the present invention.

DESCRIPTION OF THE PREFERRED EMBODIMENTS

Figure 1:
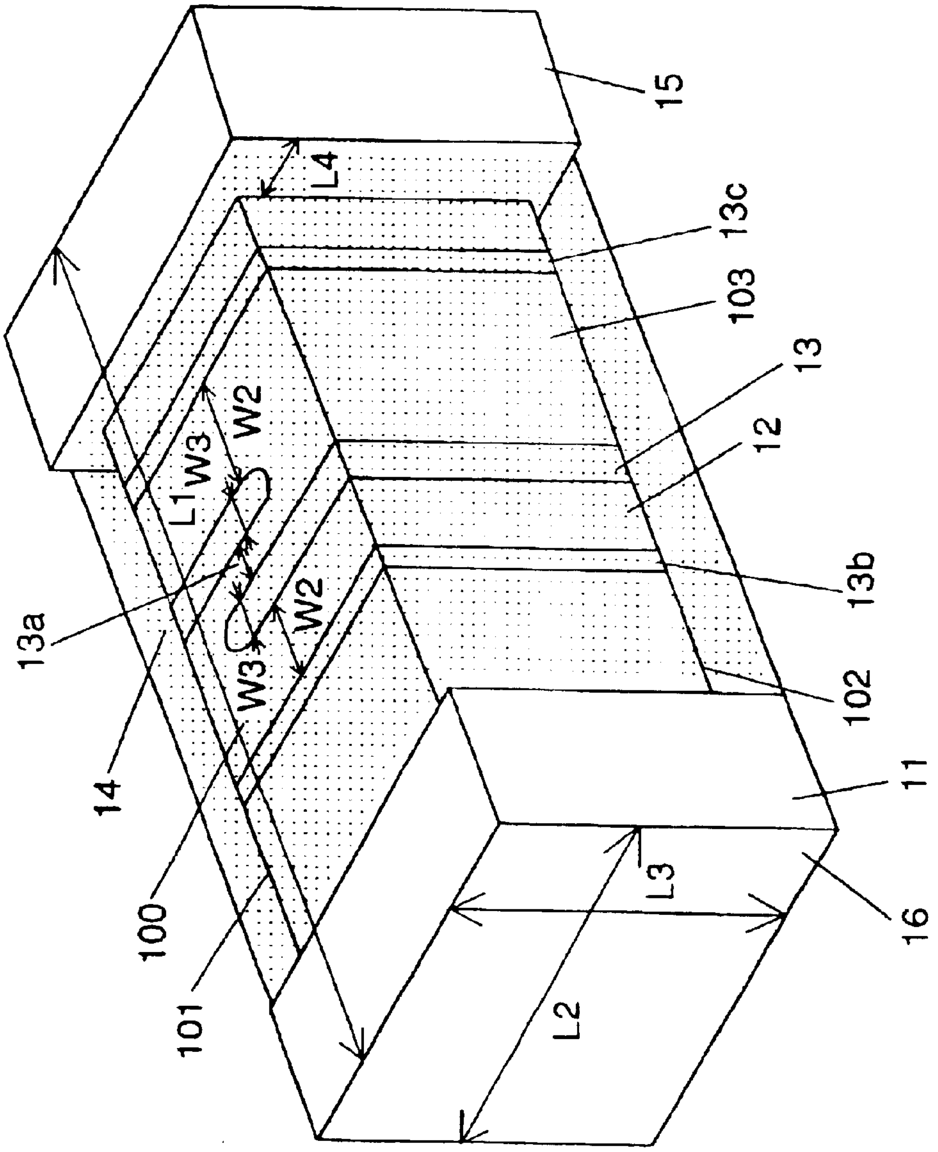
FIG. 1 is a perspective view of a circuit protector in accordance with an exemplary embodiment of the present invention.
Figure 2:
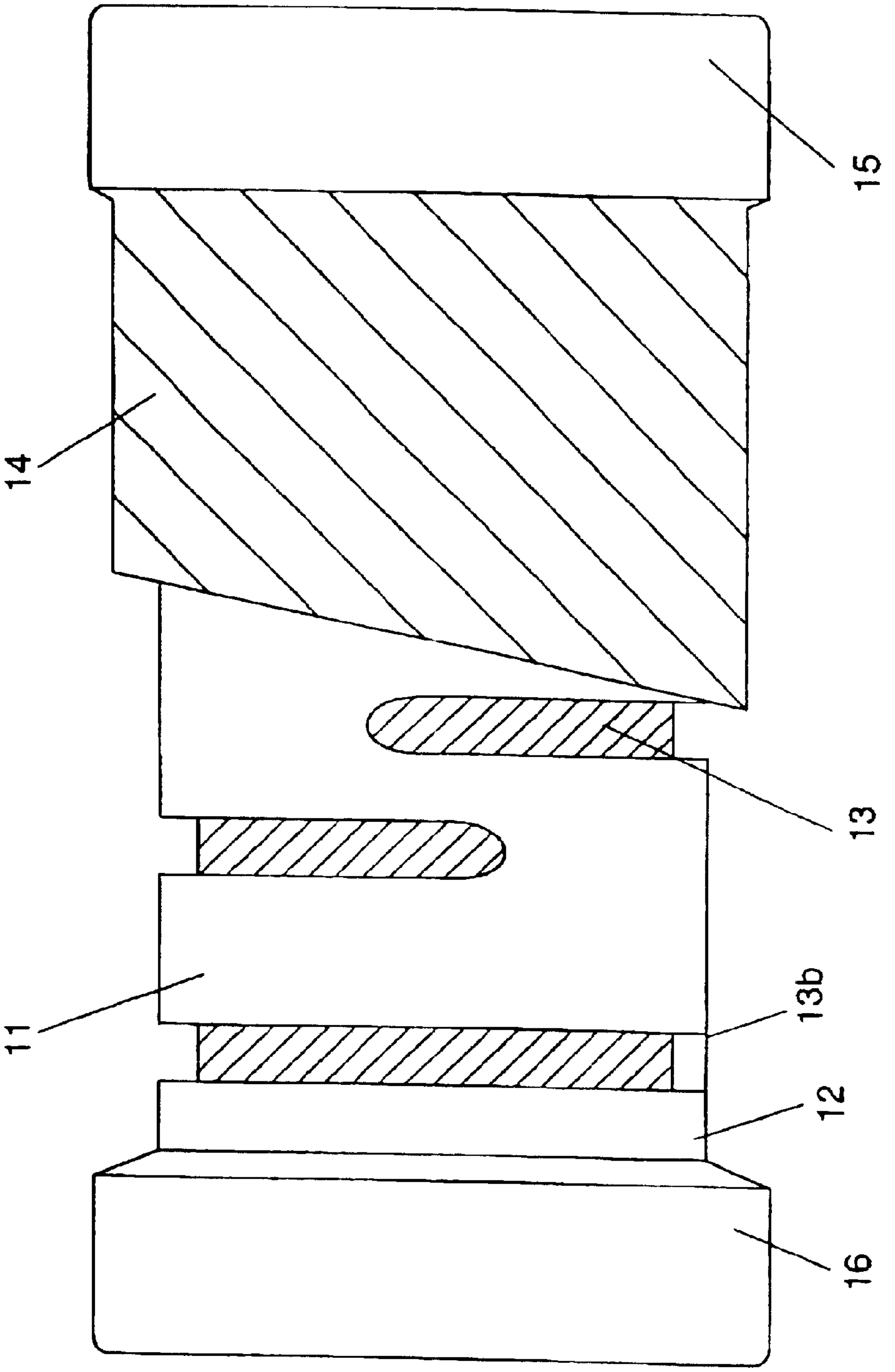
FIGS. 2A and 2B are explanatory views showing heat diffusion in circuit protectors in accordance with the present invention.

FIG. 1 is a perspective view of a circuit protector in accordance with an exemplary embodiment of the present invention. FIG. 2 shows the circuit protector of FIG. 1 as viewed from the direction Z, with part of the protection material 14 removed.

Referring to FIG. 1, a substrate 11 (see also FIGS. 9 and 10) is made of an insulating material by a press molding, extrusion or the like process. A conductive layer 12 is formed on the substrate 11 using a printing, coating or plating method, or sputtering or other vacuum deposition process. A groove 13 is formed in the conductive layer 12 by irradiating a laser beam, or by a mechanical method using a grindstone. A protection material 14 is applied to cover an area of substrate 11 and conductive layer 12 where the groove 13 is provided. Ends 11*b*, 11*c* respectively represent terminal electrodes provided at both ends of the substrate 11. A state of the conductive layer provided with the groove 13 is shown in detail in FIGS. 3(*b*)–3(*c*).

A narrowed portion 13*a* is provided at a part of the conductive layer 12, and is disposed in an vicinity of an area restricted by the two ends of continuous groove 13. A circuit protector of the present invention controls the fusing current at the narrowed portion 13*a* by defining at least one item among the width of narrowed portion 13*a* and the layer thickness of conductive layer 12. It is manufactured based on specifications obtained and established through experiments with respect to such elements as the material for substrate 11, the material and layer thickness of conductive layer 12, and the width of narrowed portion 13*a*, so that the narrowed portion 13*a* melts when a 5A current flows between the ends 11*b* and 11*c*. When an electric current of a certain specific value (e. g. 5A) flows between the terminals 15 and 16 (see FIGS. 1 and 9), the narrowed portion 13*a* melts down; thereby, the circuit protector protects a circuit board or the like (in the following recited as "board") or an electronic apparatus from getting damaged.

The grooves 13*b* and 13*c* are disposed between the narrowed portion 13*a* and the end 11*b*, and between the narrowed portion 13*a* and the end 11*c*, respectively. Referring to FIG. 1, the grooves 13*b* and 13*c* are formed on a face 100 and the next faces 101, 103 of the substrate 11; but not on the face 102, which is a face opposing to the face on which the narrowed portion 13*a* is disposed. The groove 13*b* is illustrated in detail in FIG. 3(*b*). By providing the grooves 13*b*, 13*c*, a time needed for the narrowed portion 13*a* to melt down can be made shorter and deviation in the characteristic can be made narrower, when an electric current in excess of a rated value flows and excess heat is generated. This is because the grooves prevent the heat from diffusing towards the ends 11*b*, 11*c*, and the concentrated heat surety break the conductive layer 12 at the narrowed portion 13*a*.

The grooves 13*b*, 13*c*, however, are not essential items for some of circuit protectors that operate under certain operating environments.

Preferred dimensions (length L1, width L2, height L3) for a circuit protector in the present embodiment are as follows:

L1=0.5–2.2 mm (more preferably 0.8–1.8 mm)

L2=0.2–1.3 mm (more preferably 0.4–0.9 mm)

L3=0.2–1.3 mm (more preferably 0.4–0.9 mm)

If L1 is smaller than 0.5 mm, machining of a circuit protector is very difficult, and the productivity deteriorates; while a circuit protector whose L1 is larger than 2.2 mm is too large to contribute to the downsizing of a board and an apparatus using the board.

If L2, L3 are smaller than 0.2 mm, mechanical strength of the circuit protector becomes poor and easily breaks when it is mounted by a mounter on a board. On the other hand, a circuit protector whose L2, L3 are larger than 1.3 mm is too large to contribute to the downsizing of a board and an apparatus using the board.

L4, which is the step height of the ends 11*b*, 11*c* from the middle part of substrate 11, should preferably be 20 $\mu$m–100 $\mu$m. If L4 is less than 20 $\mu$m, a protection material 14 is compelled to be very thin if a fusion accelerator is applied on the narrowed portion 13*a* and covered by the protection material 14. As a result, the accelerator might be ill-affected by a mechanical shock during mounting operation, which would endanger a characteristic a circuit protector is expected to perform. If L4 is more than 100 $\mu$m, mechanical strength of the substrate 11 becomes poor, which leads to an easily broken circuit protector.

The above-configured circuit protector is described more in detail in the following.

Shape of substrate 11 is described with reference to FIG. 3 and FIGS. 4A, 4B.

Figure 3:
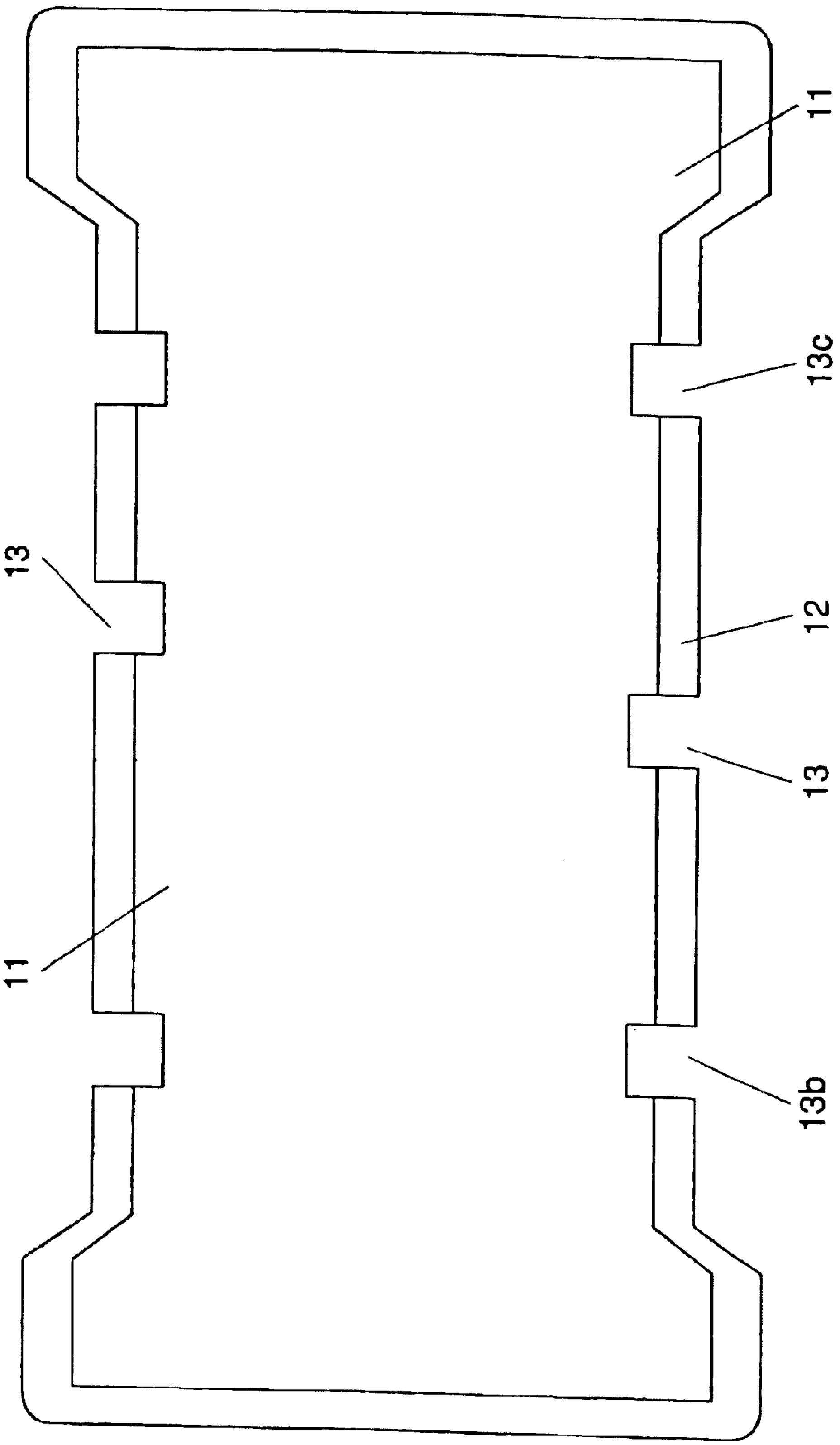
FIG. 3 is a perspective view of a circuit protector in accordance with an exemplary embodiment of the present invention.

Referring to FIG. 3, cross sectional view of substrate 11 has a square shape in consideration of an easy mounting on a board. The same applies to the ends 11*b*, 11*c*. Besides the square shape, the ends 11*b*, 11*c* and the middle part 11*a* may have a polygonal shape, such as pentagonal, hexagonal or the like shapes in the cross section.

In a substrate 11 of the present embodiment, faces in the middle part 11*a* have been stepped down to a lower level from those of the ends 11*b*, 11*c*, in order to provide in the middle part 11*a* a space for a protection material 14 so that it does not make contact with a board. If a circuit protector can be mounted on a board without having any difficulty, the circuit protector may have a substrate whose cross sectional shape remains the same through the whole part from the end 11*b* to the end 11*c*. With a substrate of the foregoing shape, mechanical strength of a circuit protector improves, so is the productivity.

Figure 4:
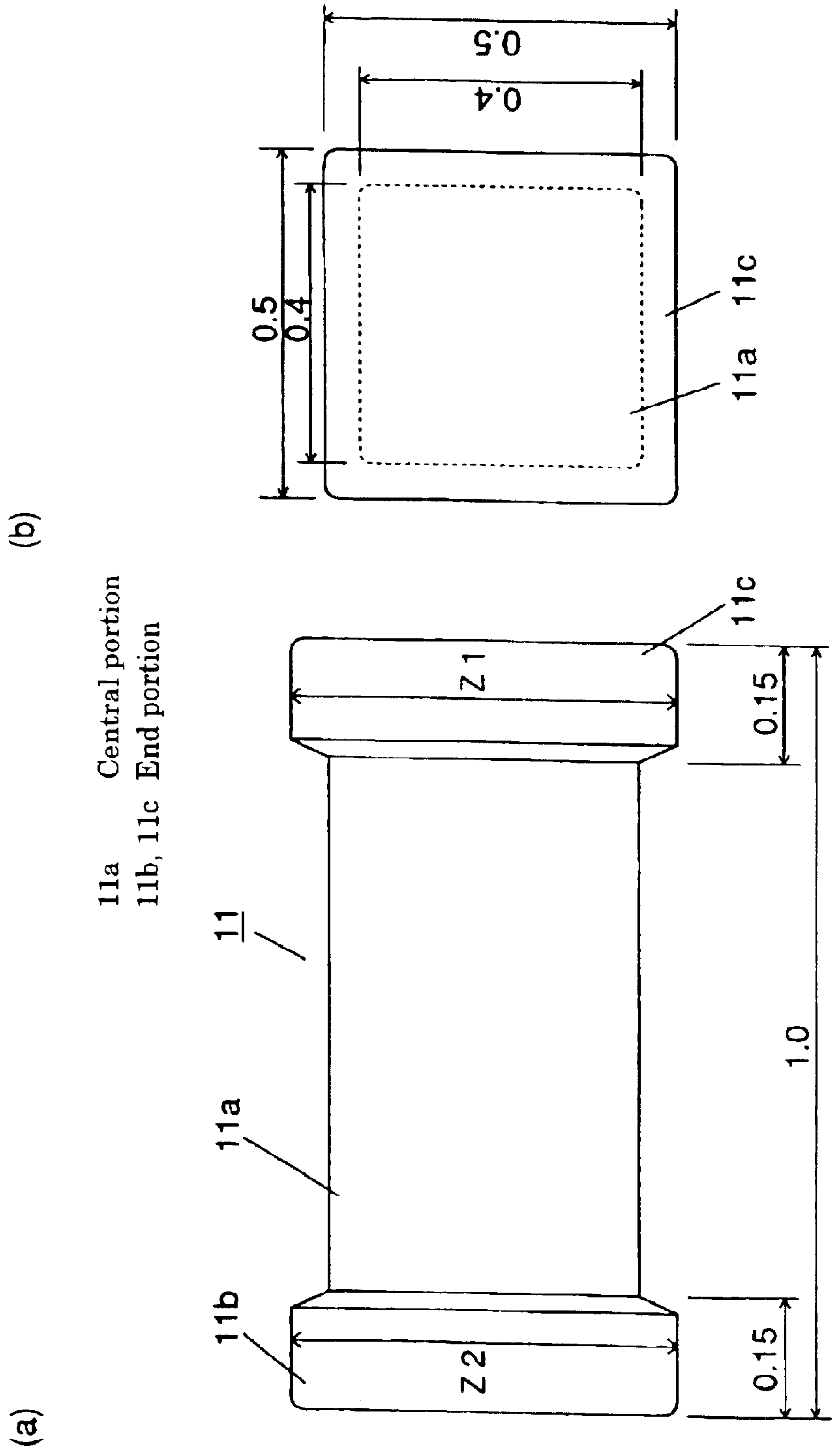
FIG. 4A is a side view of a substrate used in an exemplary embodiment of the present invention.
FIG. 4B is a side view of a substrate used in an exemplary embodiment of the present invention.

It is preferred that the heights Z1, Z2 in FIG. 4A at the respective ends 11*c*, 11*b* fulfil the following conditions.

$|Z1-Z2|<80\ \mu m$ (more preferably 50 $\mu$m).

If the difference between Z1 and Z2 exceeds 80 $\mu$m, provability of the Manhattan phenomenon starts increasing significantly. So, the difference should preferably be less than 50 $\mu$m.

Figure 5:
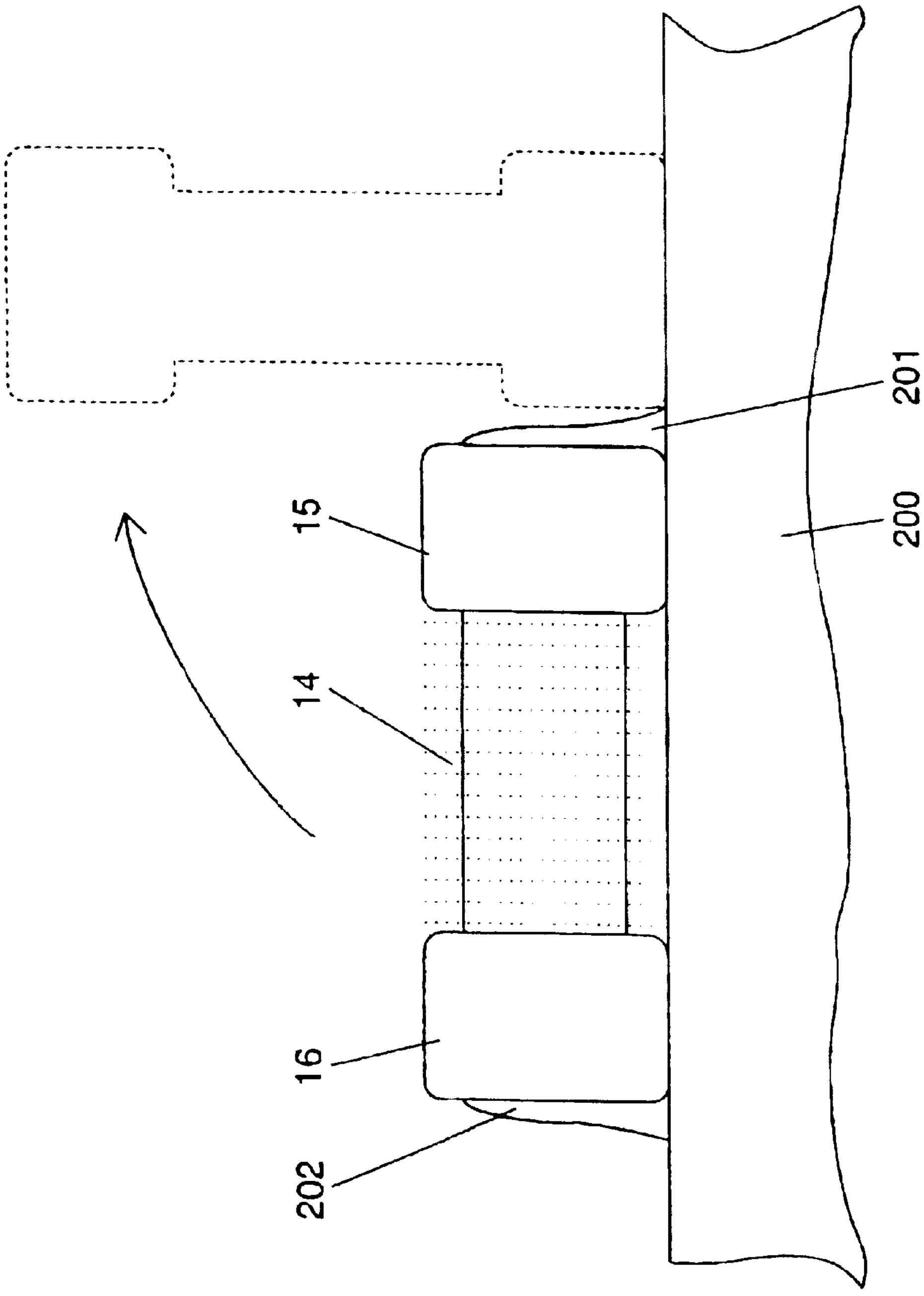
FIG. 5 is a side view showing a so-called "Manhattan phenomenon".

Manhattan phenomenon refers to a trouble in which a circuit protector stands upright on a board during a process of soldering it on a circuit board, as shown in FIG. 5. This is caused by a surface tension of molten solder, which pulls a circuit protector at one end. When circuit protectors are placed on a board 200 with solders 201, 202 applied between the ends 11*b*, 11*c* and the board 200, and the solders 201 and 202 melts during a reflow soldering or the like processing, some of the circuit protectors would stand upright in a revolving motion on one of the ends (11*c* or terminal 15 in FIG. 5). This phenomenon occurs when there is a difference in the amount between the solders 201 and 202. The difference results in a difference in the strength of surface tensions due to the molten solders 201 and 202.

Manhattan phenomenon especially occurs with tiny and light-weight electronic components (including chip-type circuit protectors). When a component having a difference in the height between the ends 11*b* and 11*c* is placed on a board 200 causing a slant posture, Manhattan phenomenon would take place. The phenomenon can be remarkably suppressed by controlling the difference between Z1 and Z2 of a substrate 11 to be smaller than 80 μm. If it is further controlled to be within 50 μm, occurrence of Manhattan phenomenon will substantially be eliminated.

Next, the chamfering of a substrate 11 is described.

Figure 6:
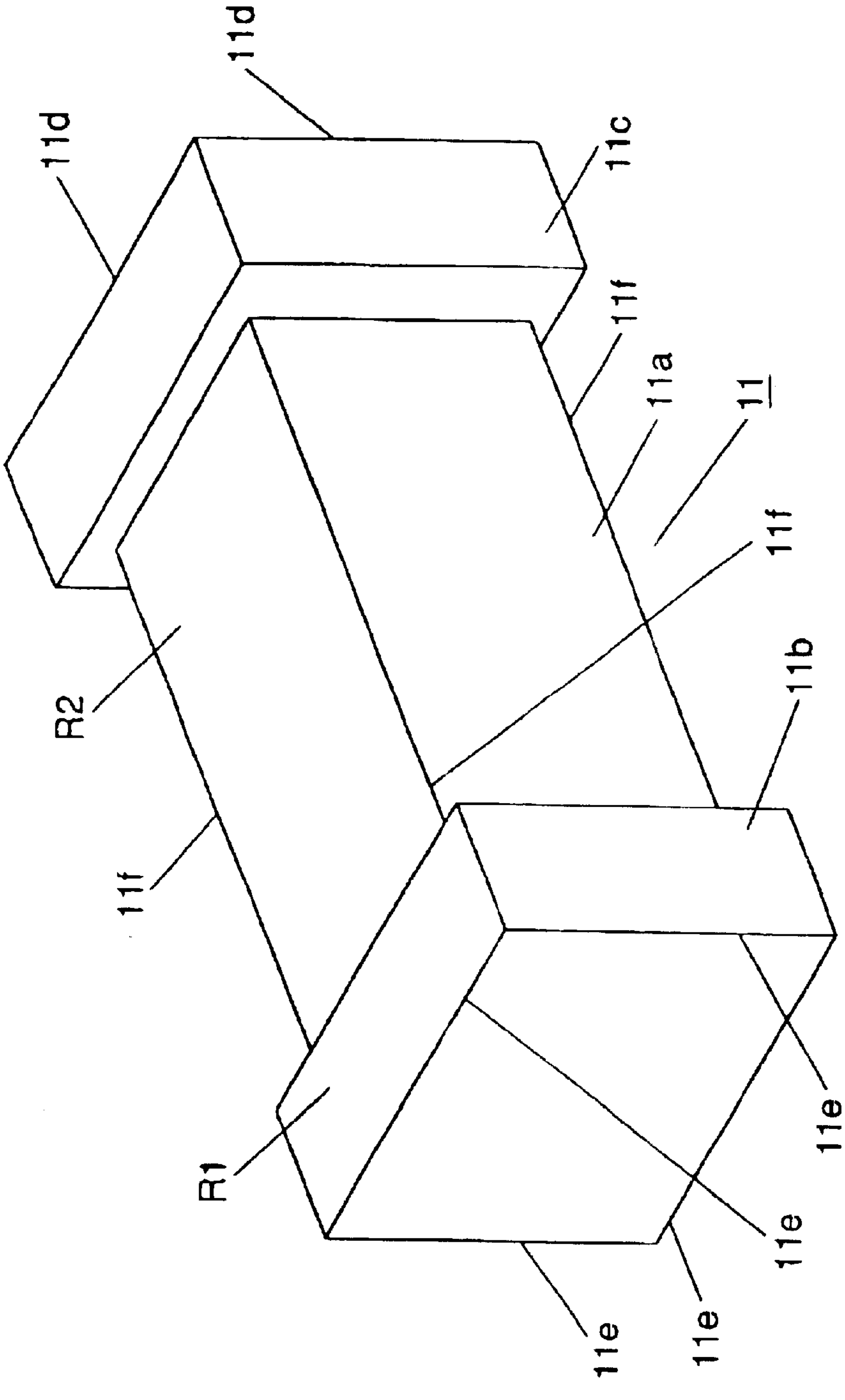
FIG. 6 is a perspective view of a substrate used in an exemplary embodiment of the present invention.

FIG. 6 shows a perspective view of a substrate of a circuit protector. Edges 11*e*, 11*d* of the ends 11*b*, 11*c* of substrate 11 are chamfered. Radius of curvature R1 at the chamfered edges 11*e*, 11*d*, and R2 at the edge 11*f* of middle part 11*a* should preferably be as follows;

$0.03<R1<0.15$ (mm)

$0.01<R2$ (mm)

When R1 is smaller than 0.03 mm, the edges 11*e*, 11*d* are shaped too sharp, which means they can be easily broken by a slight mechanical shock and ill-affects the characteristics of a circuit protector. If R1 is more than 0.15 mm, the edges 11*e*, 11*d* are shaped too rounded, which means that it is prone to invite Manhattan phenomenon. If R2 is smaller than 0.01 mm, the circuit protectors will have a wide deviation in the characteristics, since the edge 11*f* readily produce burr which sometimes leads to a significant difference in the thickness of conductive layer 12 between the flat part and the edge 11*f* part.

Material for the substrate 11 is described below. The material should preferably have the following properties;

Volume resistance: more than $10^{13}$ Ωm (preferably more than $10^{14}$ Ωm)

Coefficient of thermal expansion: lower than $5\times10^{-4}$/° C. (preferably lower than $2\times10^{-5}$/° C.) [20° C.–500° C.]

Bending strength: higher than 1300 kg/cm$^2$ (preferably higher than 2000 kg/cm$^2$)

Density: 2–5 g/cm$^3$ (preferably 3–4 g/cm$^3$)

In a case where the cubical resistance value of substrate 11 is less than $10^{13}$ Ωm, the circuit protector does not operate satisfactory against an over current, since the substrate 11 also allows a certain amount of electric current to flow.

A substrate 11 meeting the foregoing properties in thermal expansion coefficient substantially avoids possible crack troubles. This contributes also to prevent deterioration of the conductive layer 12, and wide deviation in the characteristic with the conductive layer 12 can be prevented. If the coefficient of thermal expansion of substrate 11 is higher than $5\times10^{-4}$/° C., it would invite cracks due to heat shock, because when a substrate 11 undergoes a laser beam processing or machining with a grindstone for forming the groove 13 temperature of the substrate 11 becomes high locally.

If the bending strength is lower than 1300 kg/cm$^2$, the circuit protector might be broken during mounting on a board.

If the density is lower than 2 g/cm$^3$, rate of humidity absorption of the substrate 11 becomes high, which significantly deteriorates property of the substrate 11 and characteristics of a finished circuit protector. If it is higher than 5 g/cm$^3$, weight of the substrate increases, which would lead to a trouble during mounting operation. A substrate whose density falls within the above-described range leads to a satisfactory results; which absorbs less humidity, watery hardly creepes into the substrate 11, furthermore it is light in weight. So, such a circuit protector may be mounted by a chip mounter without any trouble.

As described above, deviation of the characteristics among finished circuit protectors can be suppressed and cracks in the substrate due to heat shock and the like can be avoided to reduce a failure rate, when the volume resistance, coefficient of thermal expansion, bending strength and density of the substrate 11 are well controlled. An increased mechanical strength of substrate 11 contributes to the ease of mounting of finished circuit protectors; which leads to an increased productivity of board production.

A ceramic material containing alumina as the main ingredient is one of the preferred materials for substrate 11. However, a substrate 11 made of such a ceramic material does not immediately yield the superior characteristics described in the foregoing. The favorable characteristics can only be obtained when substrates 11 are produced under controlled manufacturing conditions, which including such factors as the pressing pressure, the sintering temperature, and certain additives added. Some of the manufacturing conditions are; for example, a pressing pressure of 2–5 t, sintering temperature of 1500–1600° C., sintering time of 1–3 hours.

Next, description is made on the surface roughness of substrate 11. The surface roughness in the present invention refers to a center line average roughness specified in JIS B0601.

Figure 7:
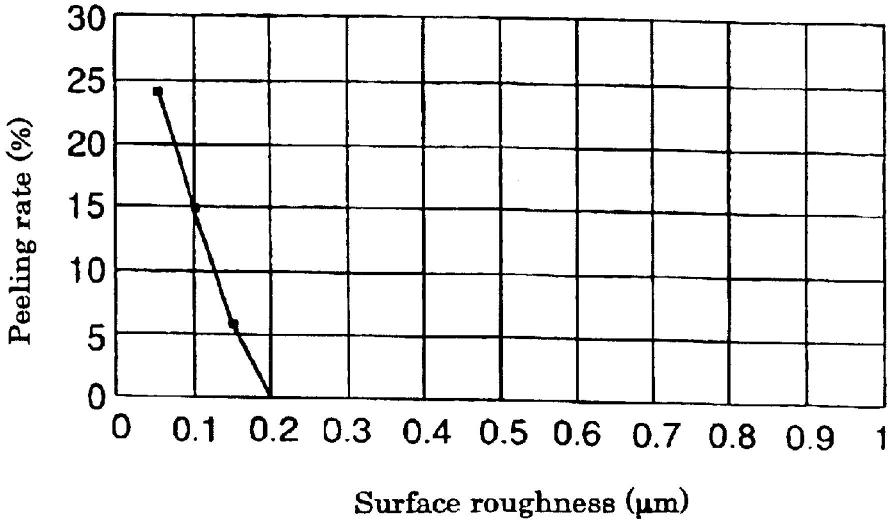
FIG. 7 is a graph showing a relationship between the peel-off trouble and the surface roughness in a substrate used in an exemplary embodiment of the present invention.

FIG. 7 shows a results of an experiment conducted with respect to the surface roughness of substrate versus peeling-off ratio of conductive layer 12. The substrates used in the experiment were manufactured under the conditions described below.

Material for the substrate 11 is alumina, and copper for the conductive layer 12. Sample substrates 11 were manufactured to provide different surface roughness, and each of the respective substrate was provided on the surface with a conductive layer 12 under the same processing conditions. After each of the samples was cleaned using an ultrasonicvibration, the surface of the conductive layer 12 was observed to check if there is peeled conductive layer. Surface roughness of substrates 11 were measured using a surface roughness measurement device (model 574A by Tokyo Seimitsu Surfcom) having a probe of R=5 μm at the tip-end.

As is shown in FIG. 7, the peeled conductive layer 12 is observed for as low as approximately 5% with the substrates having average surface roughness below 0.15 μm. These substrates demonstrate satisfactory values in the coupling strength between the substrate 11 and the conductive layer 12. With those substrates having the surface roughness higher than 0.2 μm, the peeled conductive layer 12 is hardly observed, which means that the surface roughness of substrate 11 should preferably be higher than 0.2 μm. Percentage of peeled conductive layer 12 should preferably be lower than 5%, since the peeled conductive layer 12 is a major factor of causing deteriorated characteristics among the finished circuit protectors, and poor yield during production. Based on experimental results, preferable surface roughness with the substrate 11 is within a range of 0.15–1.0 μm, more preferably 0.2–0.8 μm.

It is also preferred that the ends 11*b*, 11*c* have a different surface roughness from that of the middle part 11*a*. Surface roughness at the ends 11*b*, 11*c* should preferably be smaller than that in the middle part 11*a*, with the surface roughness at the ends 11*b*, 11*c* falling within a range of 0.15–0.5 μm. The ends 11*b*, 11*c* become terminals 15, 16 by providing a conductive layer 12 thereon. When surface roughness of the ends 11*b*, 11*c* is controlled to be within the above-described range, surface of the conductive layer 12 formed thereon can also have a small roughness. The small roughness contributes to increase a tight attachment to a board; hence, a circuit protector can be surely connected to a board.

It is preferable that surface roughness in the middle part 11*a* is greater than that at the ends 11*b*, 11*c*. Reason is that when forming a groove 13 in a conductive layer 12 using a laser beam or other means after the layer is formed, the conductive layer 12 needs to be sticking tight on the substrate 11 so as it does not peel off from the substrate 11. When a laser beam is irradiated for forming the groove 13, temperature of the irradiated place steeply rises to a level significantly higher than other area, and resulting heat shock sometimes causes a peeled conductive layer 12.

Thus the difference in the surface roughness between the middle part 11*a* and the ends 11*b*, 11*c* contributes to enhance a tight coupling between a circuit protector and the board, and to prevent the conductive layer 12 from peeling-off during the laser beam processing for forming groove 13. These factors eventually improve the characteristic of a circuit protector.

In the present embodiment, the coupling strength between conductive layer 12 and substrate 11 is raised by adjusting the surface roughness of the substrate 11. Besides the above-described way of increasing the coupling strength, there is an alternative method for the purpose without performing the adjustment of surface roughness. In the alternative method, an intermediate layer is provided between the substrate 11 and the conductive layer 12, which is comprised of at least one of pure Cr and an alloy of Cr. The coupling strength can of course be enhanced further by first adjusting the surface roughness and then further forming the intermediate layer thereon.

As to the density of a substrate 11, it is preferred that it is lower in an area other than the area in which the narrowed portion 13*a* is provided. Since an area of lower density in the substrate 11 prevents heat diffusion, it can prevent diffusion of the heat generated at the narrowed portion 13*a*.

Now conductive layer 12 is described.

Material for the conductive layer 12 can be a conductive metal such as copper, silver, gold, nickel, aluminum, a copper alloy, a silver alloy, a gold alloy, a nickel alloy and an aluminum alloy. In order to improve the anti-weatherability and other characteristics, the copper, silver, gold, nickel, etc. may be added with a certain specific alloying element. A metal material and other conductive material may be combined together. In general cases, a conductive layer 12 is made of copper or its alloy. When copper is used as the material for conductive layer 12, a substrate is first provided with an under layer through electroless plating method and then a certain specific copper layer is formed on the under layer by an electrolytic plating process. When making a conductive layer 12 with an alloy, it is preferable to use a sputtering or a vacuum deposition process. When a copper-tin alloy is used for a conductive layer 12, preferable thickness of the layer is 0.4 μm–15 μm.

A conductive layer 12 may be formed in a laminate structure formed of conductive layers of different materials. For example, a conductive layer 12 of high anti-weatherability can be provided by first forming a copper layer on a substrate 11, and then laminating thereon a layer of high anti-weatherable metal (such as nickel) to protect the copper from corrosion. An alternative way is first forming at least one of layers of copper and nickel on a substrate 11, laminating e.g. silver thereon, preferably a tin layer further on the silver layer.

Method of forming a conductive layer 12 includes plating (electrolytic or electroless plating), sputtering, vacuum deposition, coating, printing or the like method. Among these methods, plating is often used because of its high productivity and least deviation in the layer thickness.

Surface roughness of a conductive layer 12 should preferably be lower than 1 μm, more preferably lower than 0.2 μm. When the surface roughness of a conductive layer exceeds 1 μm, thickness of the layer tends to deviate; then, the characteristic of finished circuit protectors also show a deviation.

The conductive layer 12 in the present embodiment also includes a resistive layer of ruthenium oxide or the like.

Next description is on a protection material 14.

An organic material having a high anti-weatherability is used for the protection material 14; for example, an epoxy resin and the like insulating material. It is preferable that the protection material 14 is transparent so that groove 13 can be observed through it. It is, further, preferable that the transparent protection material is colored to a certain specific color retaining the transparency. When a protection material 14 is colored that is different from the color of, for example conductive layer 12 and the ends 11*b*, 11*c*, each of constituent sections of a circuit protector can be easily distinguished, and can be easily inspected. Furthermore, if the protection material 14 is colored with red, blue or green, for example, in accordance with the size, characteristics, serial numbers or the like, it contributes to avoid mounting of other types of circuit protectors erroneously mixed together.

Figure 8:
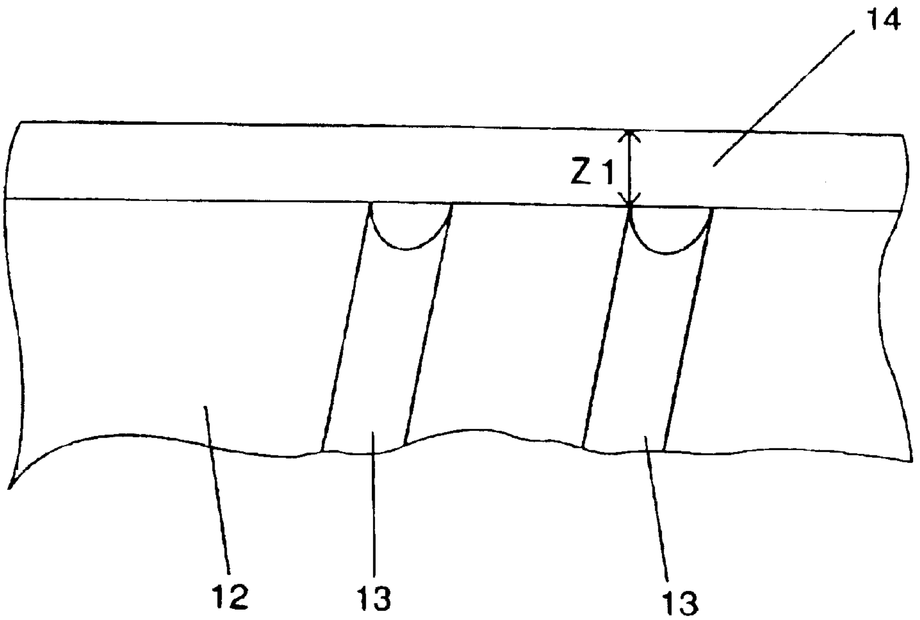
FIG. 8 is a cross sectional view of a circuit protector in accordance with an exemplary embodiment of the present invention.

It is preferred that a protection material 14 is applied so that a length Z1 shown in FIG. 8, which is a length from edge of groove 13 to the surface of protection material 14, is more than 5 μm. If Z1 is less than 5 μm, a chance of discharge increases to result in a significant deterioration of characteristics of a circuit protector. The corners of a groove 13, among other places, need to be covered with the protection material 14 for more than 5 μm, since the discharge has a tendency to take place at the corners. If the corners are not covered with protection material 14 for more than 5 μm thick, the protection material 14 may also be plated when a plating process is applied once again, after the protection material 14 is formed, for forming e.g. an electrode layer. This would deteriorate characteristics of a circuit protector. In a case where the groove 13 is provided with a flame-resistant material, for example, and the flame-resistant material has enough humidity resistance and mechanical strength, the protection material 14 may be eliminated.

Description is made on terminals 15, 16 in the following.

Although terminals 15, 16 work sufficiently well when they are provided with a conductive layer 12 alone, it is preferred that the terminals has a multi-layer structure if a circuit protector is expected to be used under several kinds of environmental conditions.

FIG. 8(*b*) shows a partial magnification of a terminal of circuit protector in an exemplary embodiment of the present invention. Referring to FIG. 8(*b*), a substrate 11 is provided at the end 11*b* with a conductive layer 12 formed thereon, a protection layer 300 of anti-weatherable nickel, titanium or the like materials is formed on the conductive layer 12. Further on the protection layer 300, a junction layer 301 of solder, lead-free solder or the like materials is provided. The protection layer 300 enhances, besides increasing mechanical strength of coupling between junction layer and conductive layer, the weather-resistive property of conductive layer 12.

The protection layer 300 of the present embodiment is formed of at least one of nickel and a nickel alloy; junction layer 301 is a solder or a lead-free solder. Preferable thickness of the protection layer 300 (nickel) is 2–7 μm; if it is thinner than 2 μm the weather-resistive property deteriorates, if it exceeds 7 μm the electric resistance of the protection layer 300 (nickel) increases and characteristics of the circuit protector significantly deteriorate. Preferable thickness of the junction layer 301 (solder) is 5 μm–10 μm; if it is less than 5 μm a good junction between circuit protector and board is impaired, if it is more than 10 μm the Manhattan phenomenon easily occurs, resulting in a significant inconvenience in the mounting operation.

The above-configured circuit protectors are highly resistive against weathering, at the same time they are superior in both the ease of mounting and the productivity.

Next, grooves 13*b* and 13*c* are described.

The groove 13*b* is provided in between the narrowed portion 13*a* and the terminal 16, while the groove 13*c* between the narrowed portion 13*a* and the terminal 15.

The respective grooves 13*b*, 13*c* are not formed in all of the faces of a substrate; as shown in FIG. 1, the grooves are provided in three faces, 100 and the adjacent faces 101 and 103. Namely, no groove 13*b*, 13*c* is provided on the face 102 opposing to the face 100. Thus the conductive layer 12 formed on the face 102 works as the electrical connection between the narrowed portion 13*a* and the end 11*b*, and between the narrowed portion 13*a* the end 11*c*.

The grooves 13*b*, 13*c* reduces diffusion of the heat generated at the narrowed portion 13*a* towards the terminals 15, 16 via the conductive layer. When such a circuit protector is mounted on a board, diffusion of the heat to the board via terminals 15, 16 can be reduced, as a result the pre-arcing time can be shortened. A heat diffusion in the conductive layer 12 is shown in FIG. 2A. In FIG. 2B, the heat diffusion is shown but without grooves 13*b*, 13*c*. The arrows in FIGS. 2A, 2B indicate the route of heat diffusion.

When a resistance of the constituent material forming a conductive layer 12 is homogeneous over the entire area, it is preferred that the width of conductive layer between both ends of the groove 13*b* and that of the groove 13*c* are broader than the width of narrowed portion 13*a*. This arrangement makes electrical resistance in the narrowed portion 13*a* to be smaller than the electrical resistance of the conductive layer 12 in an area between the ends of the groove 13*b*. In the circuit protector of FIG. 1, since no groove 13*b*, 13*c* is provided on the face 102, the width of the face 102 equals to the width of conductive layer 12 between both ends of groove 13*b*, and that of conductive layer 12 between both ends of groove 13*c*.

Although the respective grooves 13*b*, 13*c* have been provided on the faces 100, 101 and 103 in the present embodiment, the grooves may be provided only on one face (e.g. face 100 only), or on two faces (e.g. faces 100 and 101).

Preferably, the face 100 on which a narrowed portion 13*a* is disposed and the adjacent faces 101, 103 are provided with the grooves 13*b*, 13*c* as is shown in FIG. 1.

The grooves 13*b*, 13*c* should preferably be provided at least on the face 100 where a narrowed portion 13*a* is disposed. Since the grooves contribute to suppress diffusion of the heat generated at the narrowed portion 13*a* and to make the pre-arcing time short.

Figure 9:
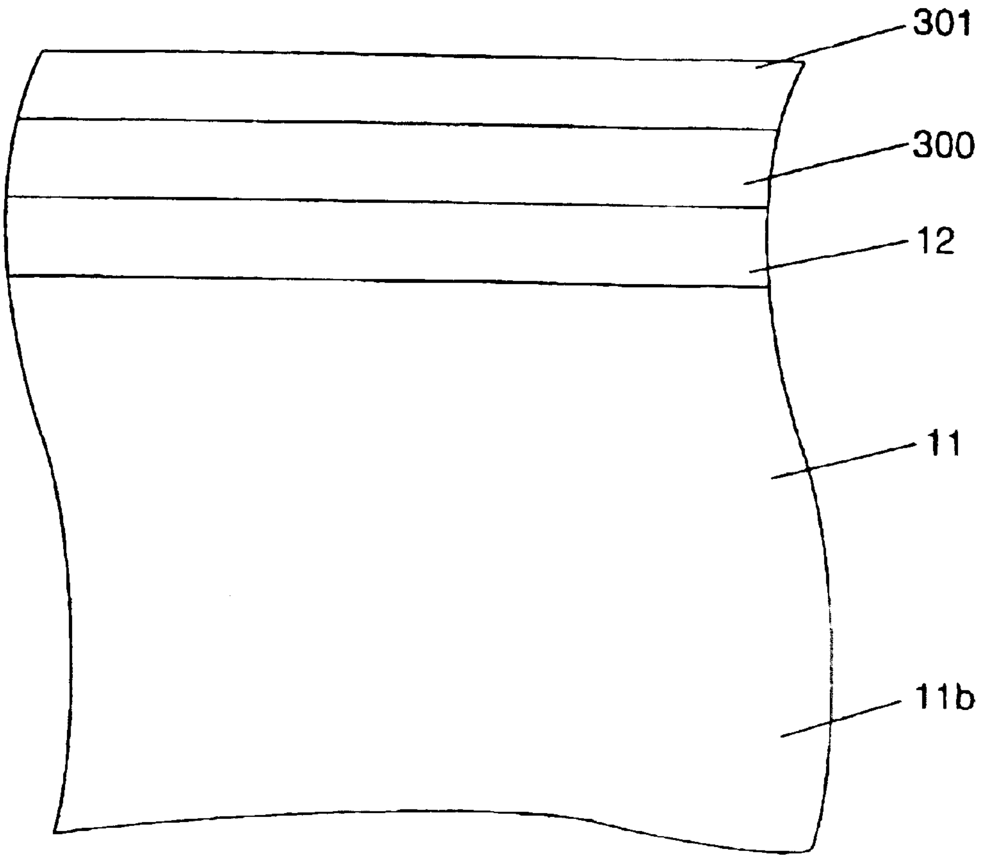
FIG. 9 is a cross sectional view of other circuit protector in accordance with an exemplary embodiment of the present invention.
Figure 10:
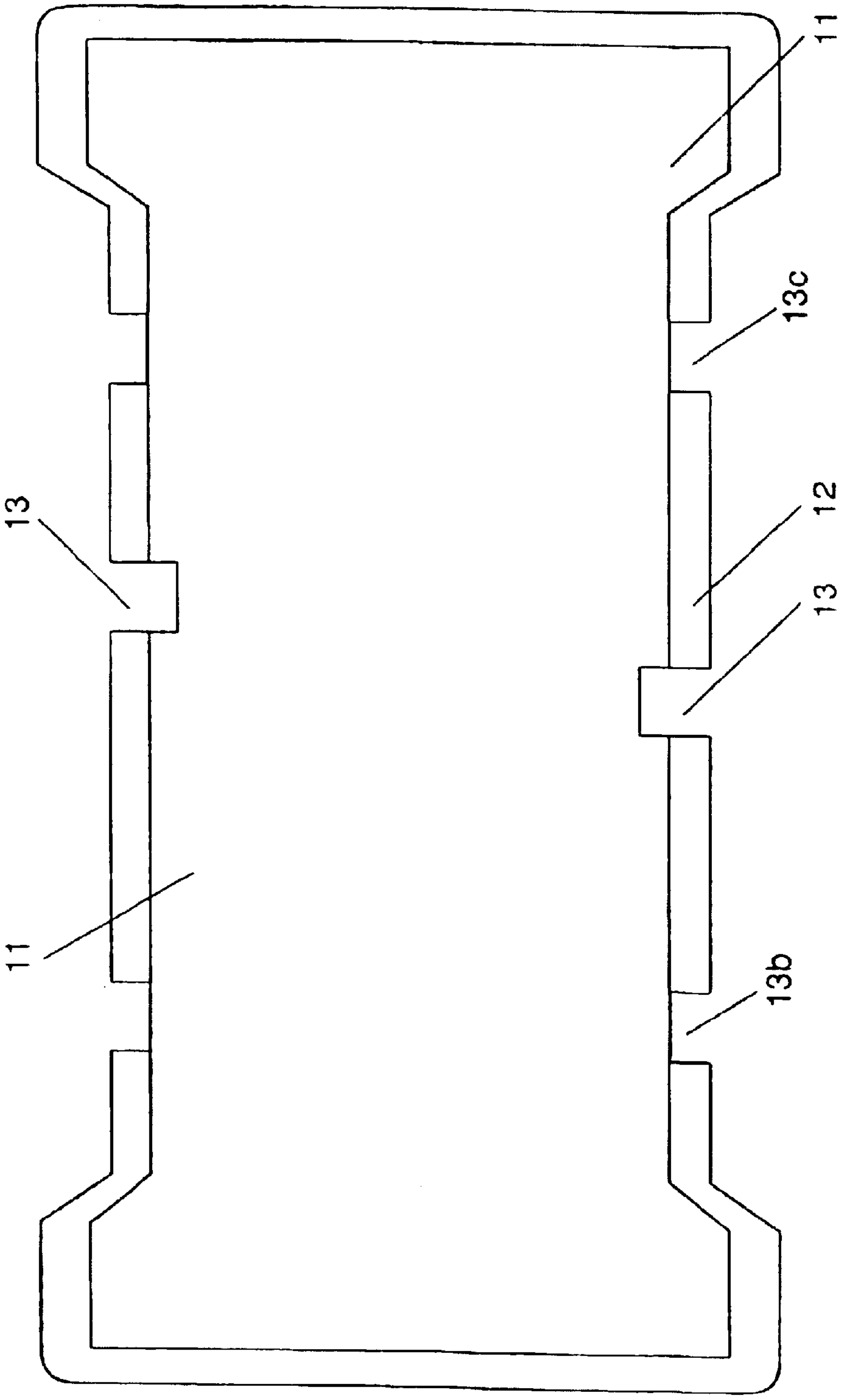
FIG. 10 is a cross sectional view of other circuit protector in accordance with an exemplary embodiment of the present invention.

In the present embodiment, the grooves 13*b*, 13*c* have been provided so that they reach the surface of the substrate 11, as shown in FIG. 3. As an alternative, only the conductive layer 12 may be removed selectively using an etching process, without forming any grooves 13*b*, 13*c* in the substrates 11, (Ref. FIG. 9). Or, as shown in FIG. 10, the grooves 13*b*, 13*c* may be formed without cutting a conductive layer 12 thoroughly; the grooves may be formed in such a manner that layer thickness in the region corresponding to the grooves 13*b*, 13*c* is thinner than that of the rest of the layer. In this configuration, it is preferred that the thickness of the layer corresponding to the grooves 13*b*, 13*c* is the thinnest in an area where the narrowed portion 13 is disposed. Because the heat conductivity of a layer becomes smaller in the thinned part, so the diffusion of the heat generated in the narrowed portion can be suppressed most efficiently at the area of thinnest layer. According to the above-described arrangement, the grooves 13*b*, 13*c* can be provided on all of the faces (faces 100, 101, 102, and 103 in FIG. 1); thereby the heat diffusion can be suppressed more effectively.

In the present embodiment, the groove has been provided for two, 13*b* and 13*c*. However, even one groove can reduce diffusion of the heat.

Figure 12:
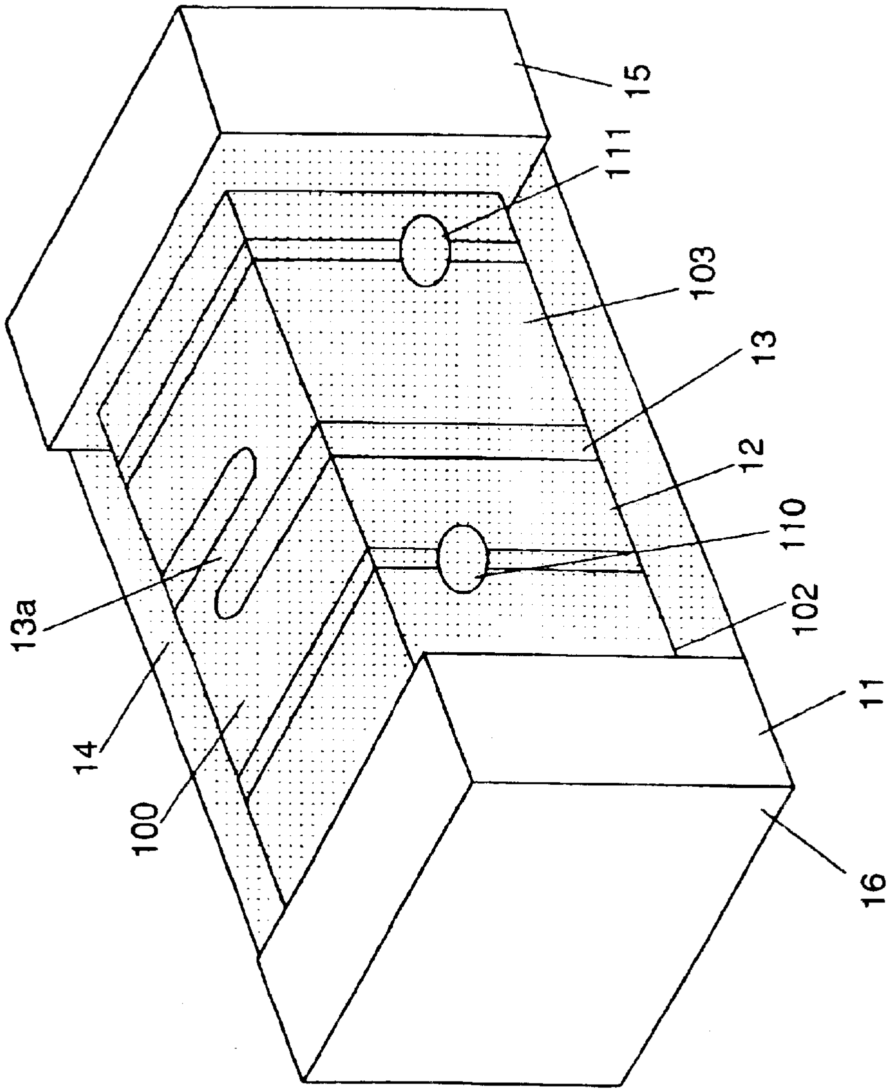
FIG. 12 is a perspective view of other circuit protector in accordance with an exemplary embodiment of the present invention.

In the present embodiment, a conductive layer 12 is provided with grooves 13*b*, 13*c*. However, as illustrated in FIG. 12, the conductive layer 12 may be provided with an area 120 of a square, a round or an oval shape, where no conductive layer 12 is formed.

Furthermore, referring to FIG. 1, width W1 of the narrowed portion 13*a*, and space W2 between the groove 13 and the grooves 13*b*, 13*c* should preferably conform to a relationship; W2÷W1 is more than 1.15. Since this relationship provides a stable characteristic without accompanying an increased electric resistance. W1 is normally 10 μm–40 μm.

Preferred groove width W3 for the groove 13 is; 6 μm<W3<45 μm (more preferably, 11 μm<W3<40 μm). In order to assure a reliable fusion of the narrowed portion 13*a*, W3 should preferably be smaller than 45 μm. With respect to the characteristics and the productivity, W3 should preferably be larger than 6 μm.

Figure 13:
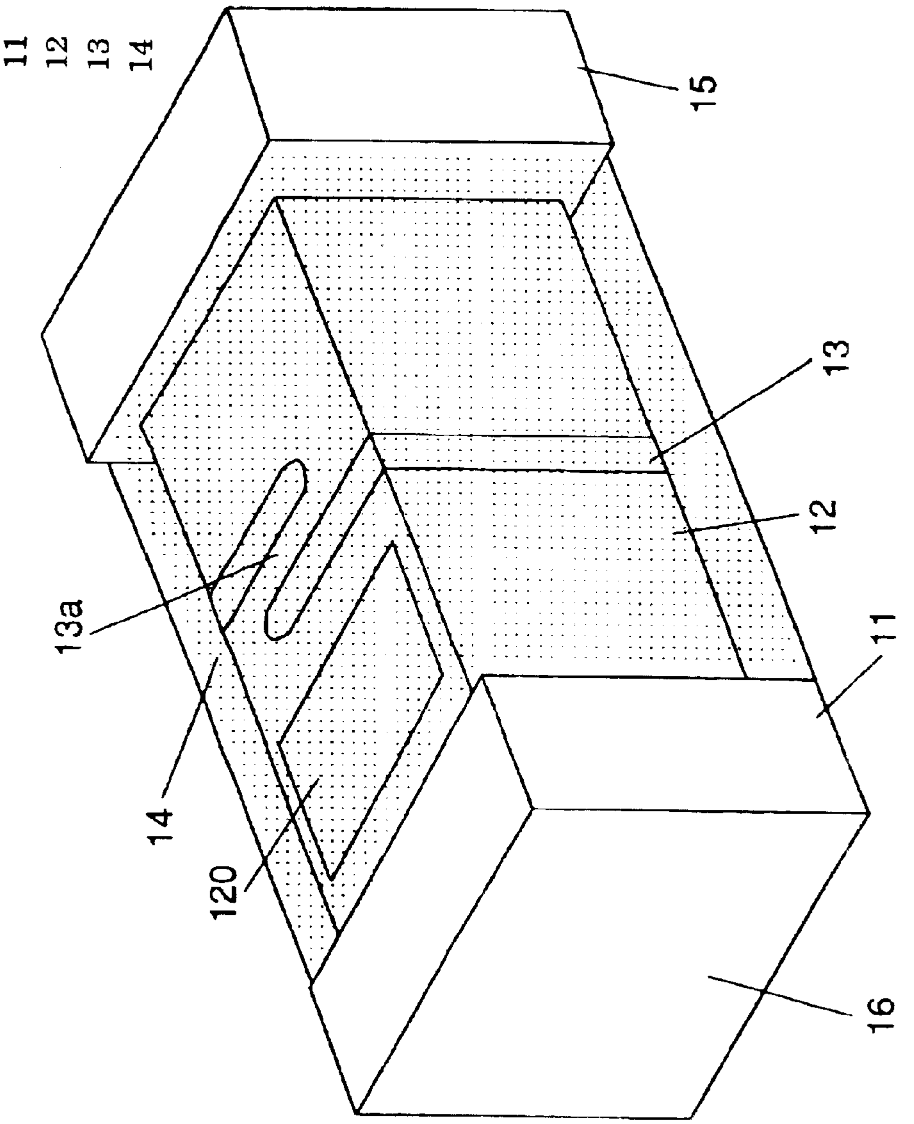
FIG. 13 is a magnification of the narrowed portion of a circuit protector, with a groove of 48 μm width.

The foregoing description is based on an experience that the time needed for fusing the narrowed portion 13*a* had a deviation among the circuit protectors manufactured in volume. After a detailed observation made on the narrowed portion, it was found out that the narrowed portion 13*a* had undergone a thermal damage. The damage seems to be relevant to the width W3 of groove 13, which was formed by laser beam irradiation. Namely, if a groove 13, specifically in the part for forming the narrowed portion 13*a*, is formed for a large width, output and focus of a laser beam need to be increased accordingly. As a result, a thermal damage is caused in the narrowed portion 13*a*. FIG. 13 is a magnification of a groove 13, formed with a targeted width W3 of 48 μm. It shows that the narrowed portion 13*a* between the groove 13 was ill-affected by a thermal damage and discolored.

In the present embodiment, width W3 has been made to be smaller than 45 μm. Thereby, laser beam output was lowered and the thermal damage in narrowed portion 13*a* has been reduced. Thus, by making the width W3 to be within a certain specified range, volume of heat generated at forming the groove 13 can be lowered and the thermal damage in the narrowed portion 13*a* can be decreased.

Groove 13 may be formed using a beam of YAG laser, Excimar laser, $CO_2$ laser or the like, which is focused using a lens, and irradiated to the middle part 11*a* of a substrate 11. The depth of groove 13 can be controlled by controlling the laser beam output, while the width by replacing a lens for focusing the laser beam. Absorption of laser beam differs depending on kind of materials forming the conductive layer 12. So, an appropriate kind of laser (wavelength of laser) has to be selected taking the material of the conductive layer 12 into consideration.

Although a laser beam was used in the present embodiment because of the high productivity, other high energy-beam such as an electron beam may be used instead.

The same problem of thermal damage arises when a groove 13 is formed using a grindstone or through a photolithographic process. If a wide grindstone is used, a substantial amount of heat is generated. So, it is important that the width of groove 13 is controlled to be within a certain specific range.

Figure 14:
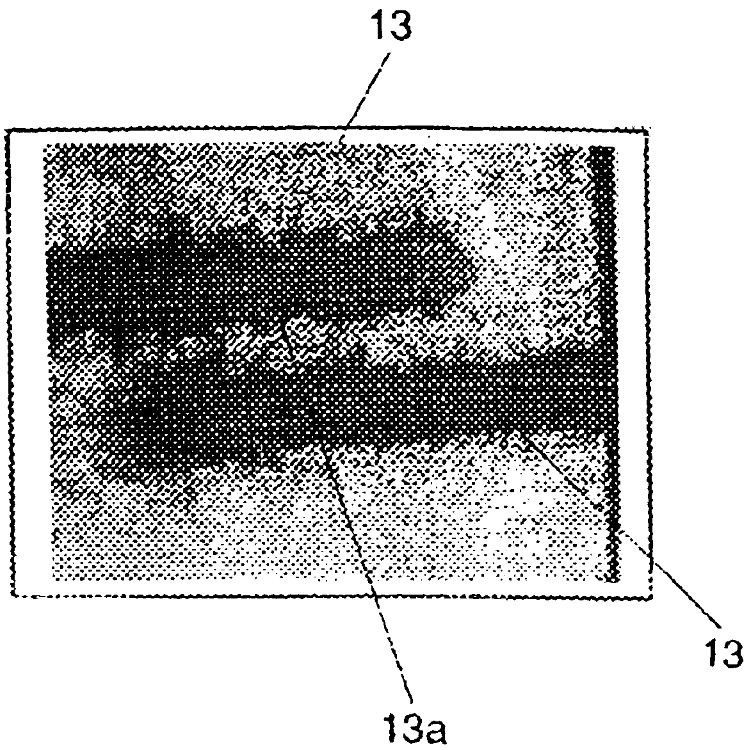
FIG. 14 is a magnification of the narrowed portion of a circuit protector, with a groove of 16 μm width.

FIG. 14 shows a state where a groove 13 is formed for a width W3 of 16 μm. In this case, hardly any discoloration is observed around the narrowed portion 13*a*. Deviation in the characteristic has been controlled to be very small among the circuit protectors manufactured in volume.

Figure 15:
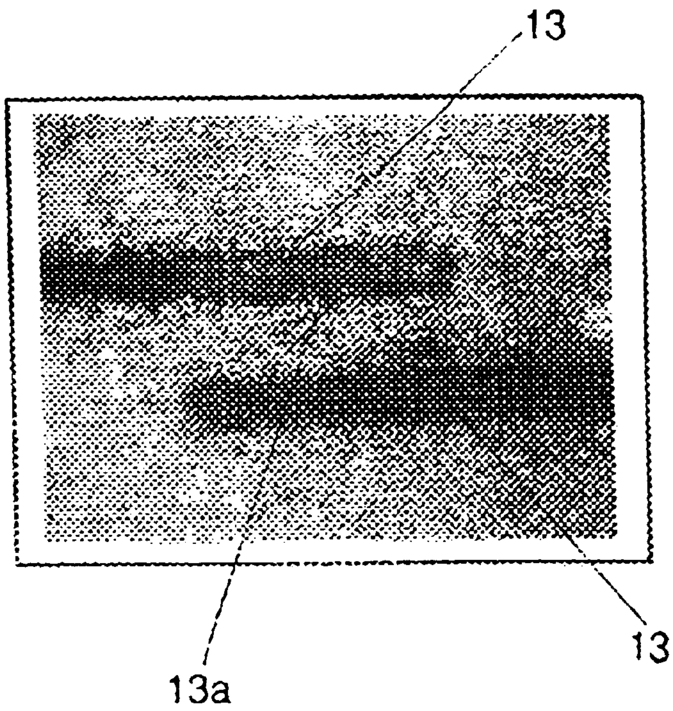
FIG. 15 shows a relation between circuit protector resistance vs pre-arcing time, at a 0.5A rated current.
Figure 16:
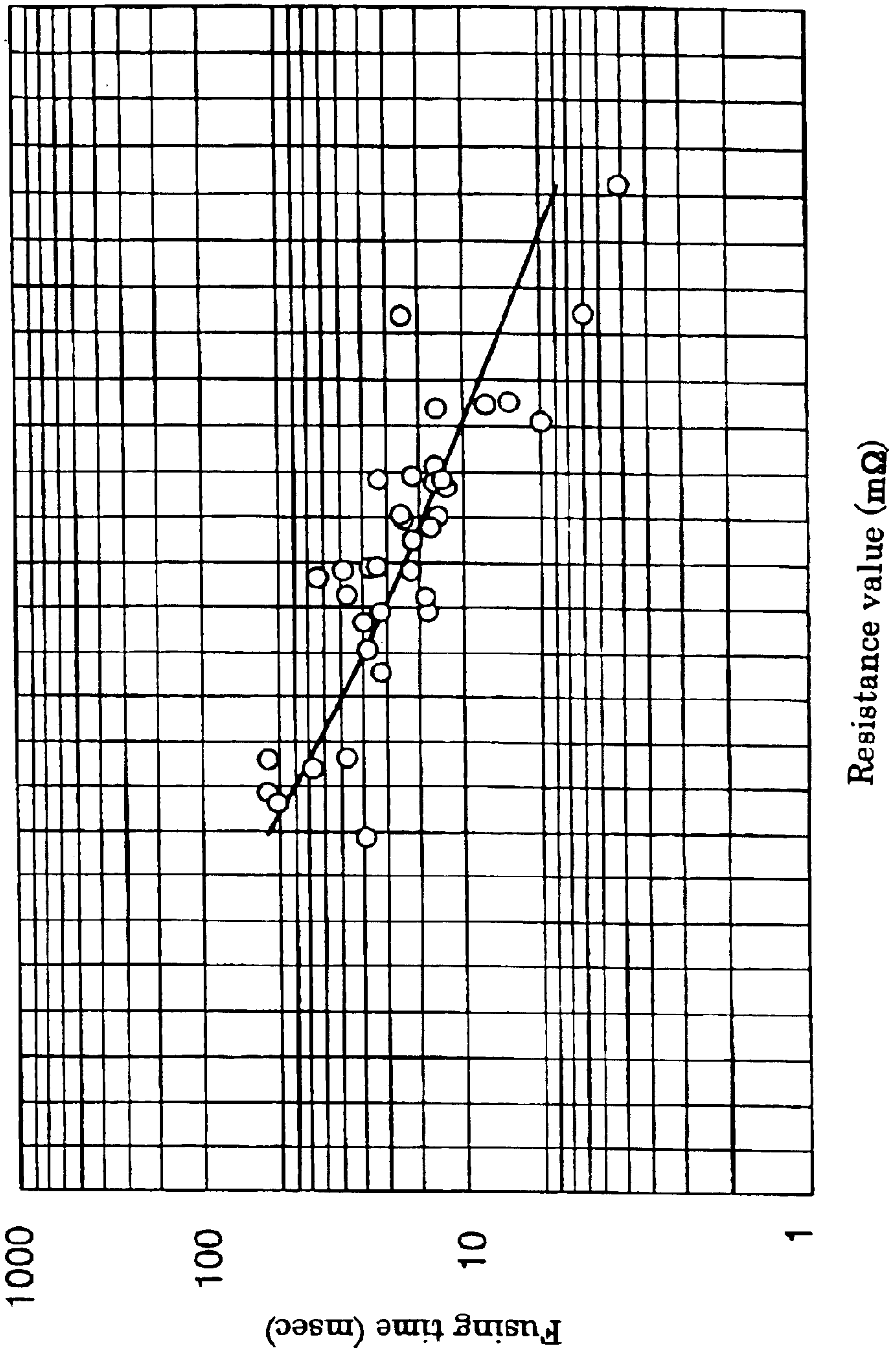
FIG. 16 shows a relation between circuit protector resistance vs pre-arcing time, at a 0.5A rated current.

Deviation in the pre-arcing time is shown in FIG. 15 and FIG. 16; that of circuit protectors having the grooves formed for the 48 μm width W3 (ref. FIG. 13) in FIG. 15, while those having the grooves formed for the 16 μm width W3 (ref. FIG. 14) in FIG. 16. Graphs FIG. 15 and FIG. 16 show a relationship between resistance of a circuit protector and the pre-arcing time at a rated current of 0.5A. As is seen from the graphs, deviation in the resistance and the pre-arcing time is smaller with those of the width 16 μm W3. After making further experiments, it has become known that when the width W3 falls within a range of 6 μm<W3<45 μm, a smaller deviation can be obtained among the circuit protectors manufactured in volume. Thus, by controlling the groove width W3 to be within a range of 6 μm<W3<45 μm, deviations in the resistance and in pre-arcing time of circuit protectors can be reduced.

Circuit protectors of the present invention having a narrowed portion 13*a* provide an already satisfactory characteristic. However, in order to make deviation smaller in terms of a sure pre-arcing time, it is preferable to provide a fusion accelerator over the narrowed portion 13*a* or in the vicinity of the narrowed portion 13*a*. The fusion accelerator may be applied covering only the narrowed portion 13*a*, or covering around the substrate 11. By applying it as such, even if the application work is not done very accurately, the fusion accelerator can be disposed surely on the narrowed portion 13*a*, as compared with a method in which the fusion accelerator is applied only on a small target spot. Furthermore, if it is disposed also in the grooves 13 forming the narrowed portion 13*a*, the narrowed portion 13*a* will have a contact with the fusion accelerator in the upper surface and at the side surfaces. This ensures a surer fusion. When a fusion accelerator is applied, the layer structure will be in the following order; a substrate 11, a conductive layer 12 (narrowed portion 13*a*), a fusion accelerator and a protection material 14.

The material for fusion accelerator includes, for example, a low melting-point glass containing e.g. lead, and the like material.

Now in the following, relationship between pores in the surface of substrate 11 and the characteristic of circuit protector is described.

In manufacturing circuit protectors, a conductive layer 12 formed on the surface of substrate 11 should have least defects. Namely, a conductive layer 12 having many defects naturally produces a narrowed portion 13*a* containing a lot of defects. This brings about a wide deviation with respect to the characteristic. The inventors of the present invention found out that the formation of a quality conductive layer 12 depends on the good control of pore area per unit area of a substrate 11.

Namely, a quality conductive layer 12 can be formed if the pore area per unit area in a slice of an area in the vicinity of surface of substrate 11 is controlled to be 1%–30% (more preferably 8%–23%). Disregarding the cost and the productivity in volume production, a substrate 11 having the pore area for less than 1% may be used.

Existence of the pore bears a significant relationship with heat conduction of a substrate. By optimizing a range for the pore area percentage, the characteristic of a narrowed portion can be further improved.

The pore area per unit area was measured by an image-processing of a microscopic observation on a surface slice of substrate 11.

Figure 17:
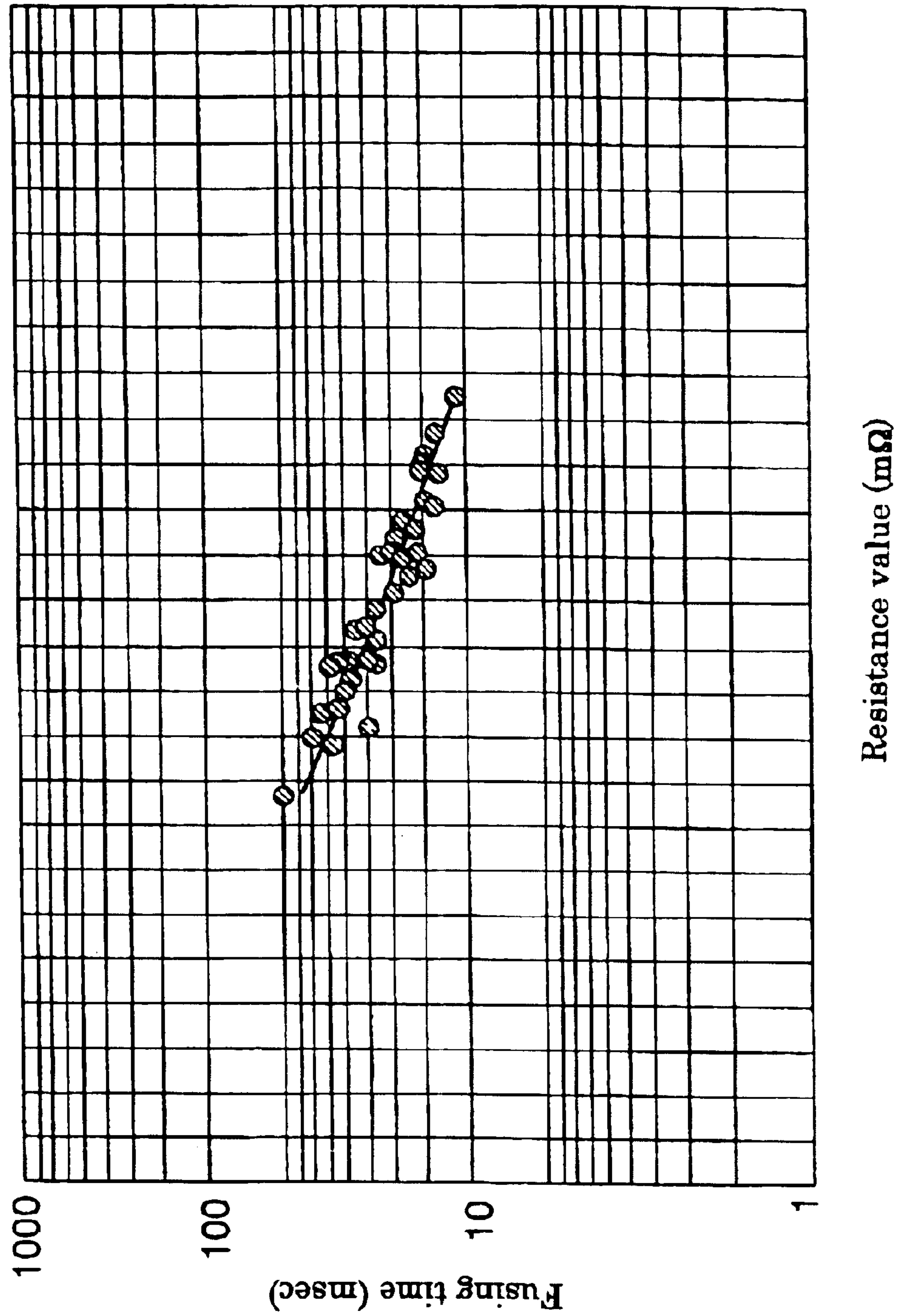
FIG. 17 is a partial magnification of a substrate surface. (Pore area 43%)
Figure 18:
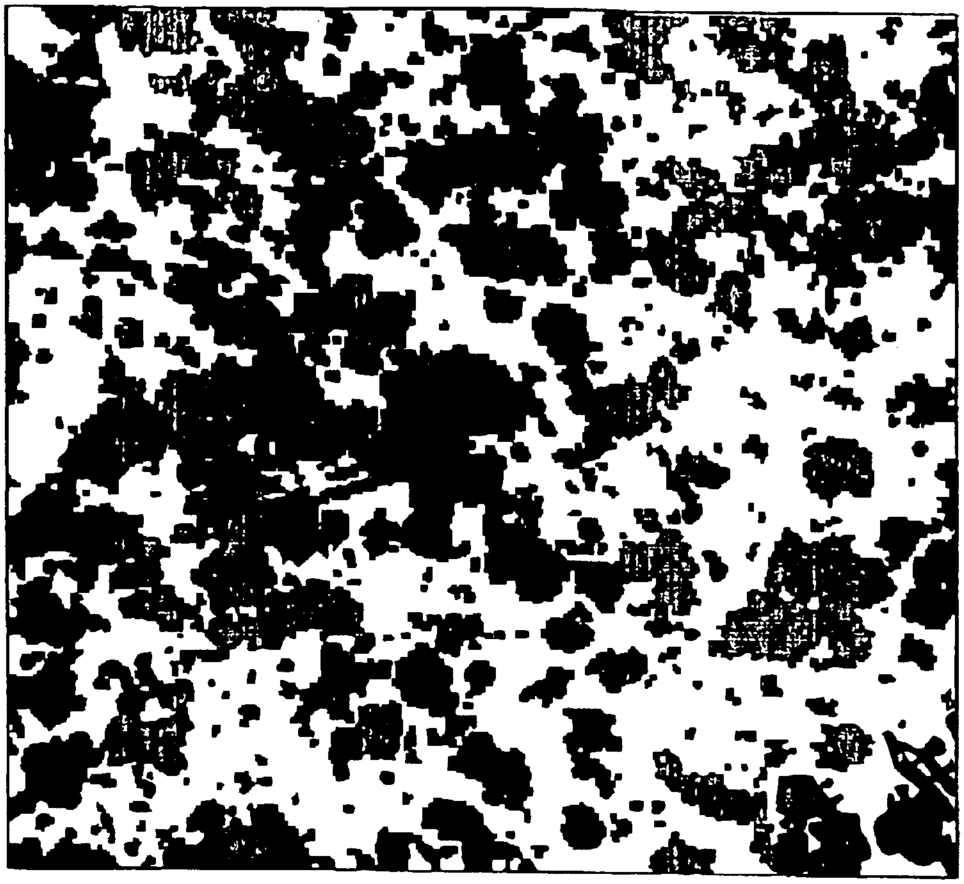
FIG. 18 is a partial magnification of a substrate surface. (Pore area 15%)

FIG. 17 and FIG. 18 show surface condition of a substrate 11; where, the area shown in black represents the pore.

FIG. 17 shows a slice having quite a number of pores with a substantial gross area; an approximately 43% pore area per unit area. No favorable conductive layer 12 can be formed on such substrate 11; it brings about a wide deviation in the characteristic. The substrate 11 shown in FIG. 18 has a small number of pore with a small gross area; an approximately 15% pore area per unit area. This substrate 11 can form a superior conductive layer 12 thereon with a least defect. And, a satisfactory characteristic is obtained. After conducting an elaborated survey in details, the inventors found out that those having a pore area for less than 30% per unit area provide the circuit protectors with a sufficiently satisfactory characteristic.

The pore can be easily controlled by adjusting such factors as the formation density, sintering temperature, the material (e.g. alumina content), the use of additives, etc. The sample substrate 11 shown in FIG. 18 is made of a material containing alumina of 55 weight %, and at least one additive among $SiO_2$, $Na_2O$, MgO, CaO, $K_2O$, $ZrO_2$, etc.

Even a substrate 11 having much pores can provide an improved characteristic, by first forming an insulating layer on the substrate 11, and then forming a conductive layer 12 thereon. By so doing, the pore area per unit area can be lowered and dissipation of the heat can be suppressed to an improved characteristic.

An insulating layer having a thermal conductivity lower than 5.0 W/(m·k) is formed on substrate 11 for 0.01 μm–1.5 μm thick by means of vacuum deposition or sputtering, and then a conductive layer 12 is formed on the insulating layer. In this way, the pore area per unit area can be reduced, and the heat diffusion is suppressed. Thereby, the characteristic is improved.

Preferred material for the insulating layer includes steatite, cordierite, mullite, forsterite and $SiO_2$. It is preferable to form the insulating layer with at least one of the above materials. Use of $SiO_2$, among others, provides a very low thermal conductivity and a suppressed pore.

Now in the following, a method for manufacturing the above-configured circuit protectors is described.

A substrate 11 is manufactured by sintering a press molded or extrusion molded insulating material such as alumina. Then, a conductive layer 12 is formed over the entire surface of the substrate 11 using a plating method or a sputtering process. If the substrate 11 has too many pores, an insulating layer is provided by deposition or other method, as described earlier.

Groove 13 in a herical arrangement, and grooves 13*b*, 13*c* are formed in the conductive layer 12 using a laser beam or by grinding. Depending on product specification, the grooves 13*b*, 13*c* may be eliminated. The groove 13, however, is essential for the formation of a narrowed portion 13*a*. The laser beam processing is highly productive and suitable in providing such grooves.

The narrowed portion 13*a* is thus formed by the groove 13 provided by using a laser beam. If a conductive member 110, 111 bridging the groove is needed as is explained in a separate example to be described later, it is provided at this stage of production, coupling the conductive layers 12.

If required by an operating environment or by a specification, a protection material 14 is applied and dried. When a fusion accelerator is used, it is applied on the narrowed portion 13*a* before applying a protection material 14.

This completes a finished product. However, in a case where an additional anti-weathering property or junction performance is required, terminals 15, 16 are further laminated with a nickel layer, and a solder layer. The nickel layer and the solder layer are plated after the application of the protection material 14.

Second Embodiment

A circuit protector in accordance with a second exemplary embodiment of the present invention is described with reference to FIG. 19.

Figure 19:
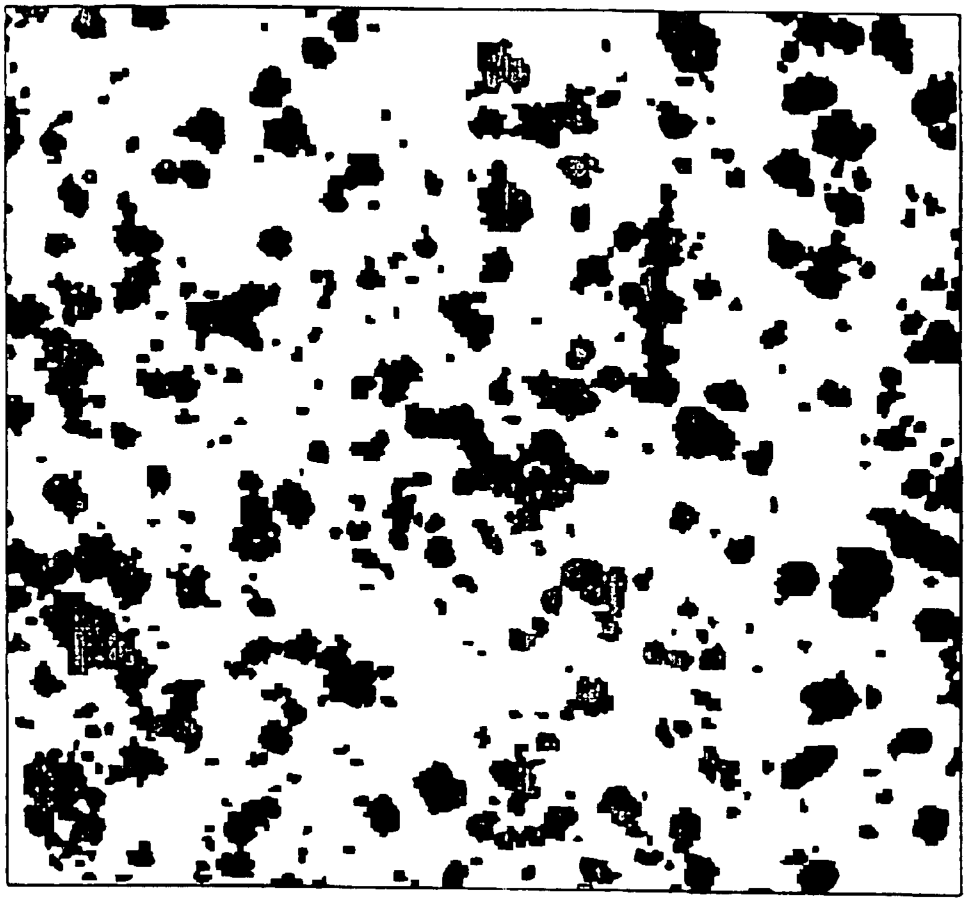
FIG. 19 is a perspective view of a circuit protector in accordance with an exemplary embodiment of the present invention.

In FIG. 19, a substrate 411 comprises a substrate and a conductive layer 412 provided on the substrate. The substrate is formed of an insulating material through a press molding or an extrusion molding, while the conductive layer 412 is formed on the substrate using a printing, coating or plating method, or by a sputtering or the like vacuum deposition process. A groove 413 is formed on the conductive layer 412 by irradiating a laser beam, or through a mechanical method using a grindstone or the like. Or, the groove 413 may be formed by a photo-lithographic process. Namely, the groove 413 may be formed by first providing a conductive layer 412 over the entire surface and then trimming it, or by defining a vacant region for the groove 413 before forming a conductive layer 412. A protection material is applied on a section of substrate 411 where the groove 413 is provided. The groove 413 and the protection material 414 are disposed between a terminal 415 and a terminal 416. The protection material 414 may be eliminated depending on a product specification.

A narrowed portion 413 formed between the groove 413 is a part of the conductive layer 412. The value of pre-arcing current is controlled by controlling at least one of width and thickness of the conductive layer in the narrowed portion 413*a*. In practice, when manufacturing a circuit protector of pre-arcing current of 5A, for example, elementary data on items required for satisfying the product specifications are studied and confirmed by experiments in advance. Such items include material of layer 412, the conductive layer thickness, the width in narrowed portion 413*a*, material for substrate, etc. Production activities are performed based on the above data obtained through the experiments. When electric current of a certain specific value (e.g. 5A) is delivered, a circuit protector fuses at the narrowed portion 413*a* to protect a circuit board, or an electronic appliance, from being damaged by an over current.

It is preferable that the circuit protectors of the present embodiment also conform to the relative relationship among length L1, width L2 and height L3 described in the earlier embodiment.

A feature of the circuit protectors in the present embodiment is in the mounting structure where the side face 411*a* does not face to a board, and that cross sectional shape of the terminals 415, 416 is not a regular square, but it is a rectangle.

In FIG. 19, width (L3) at faces 415*a*, 415*b*, 416*a*, 416*b* in terminals 415, 416 is greater than width (L2) at side faces 415*c*, 415*d*, 416*c*, 416*d*. While, depth (L5) at the faces 415*a*, 415*b*, 416*a*, 416*b* as well as at the side faces 415*c*, 415*d*, 416*c*, 416*d* remains substantially the same.

In the configuration of FIG. 19, there is no narrowed portion 413*a* on the larger side faces 411*c*, 411*d* (opposing to each other); the narrowed portion 413*a* is provided on the smaller side face 411*a*, or side face 411*e* which is opposing to 411*a*.

Next, description is made on a structure related to mounting of a circuit protector on the board. The point is that when a circuit protector is mounted so that the face 415*a*, 416*a* opposes to the board, a face containing the narrowed portion 413*a*, or a fusing section, never faces to the circuit board. Under such structure, most of the circuit protectors keep on showing a resistance higher than 10 kΩ after fusion.

Relative relationship between L2 and L3 should preferably be; $0.4<L2\div L3<0.90$ (more preferably $0.6<L2\div L3<0.8$). Formation of a narrowed portion 413*a* becomes difficult if the L2÷L3 is smaller than 0.4. When the L2÷L3 is greater than 0.9, there will be a risk that it is mounted erroneously on the smaller face.

Figure 20:
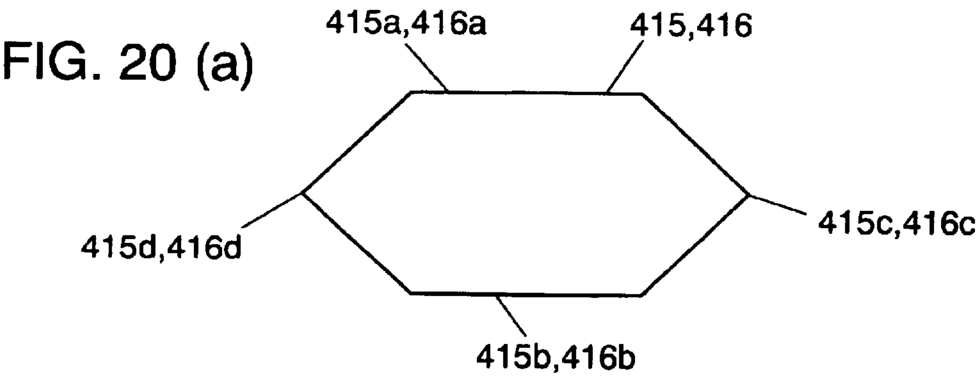
FIG. 20(*a*) is a cross sectional view of a terminal in an exemplary embodiment of the present invention.
Figure 20:
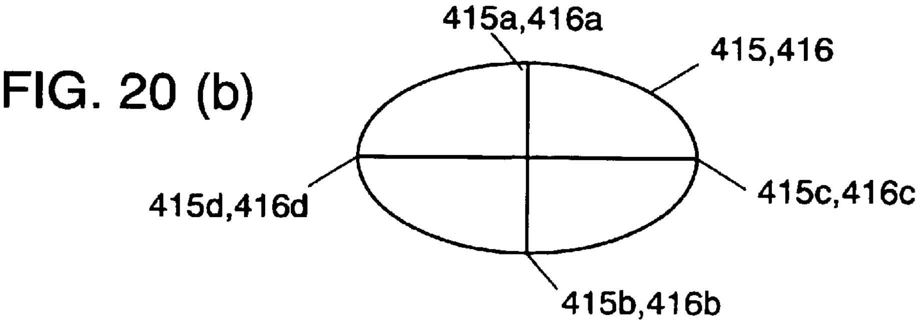
Figure 20:
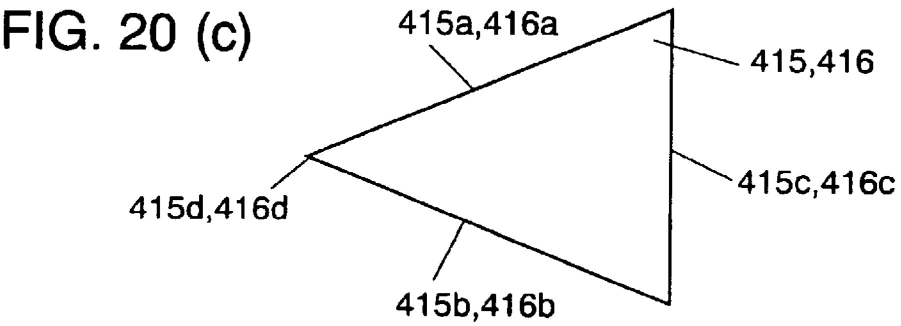
Figure 21A:
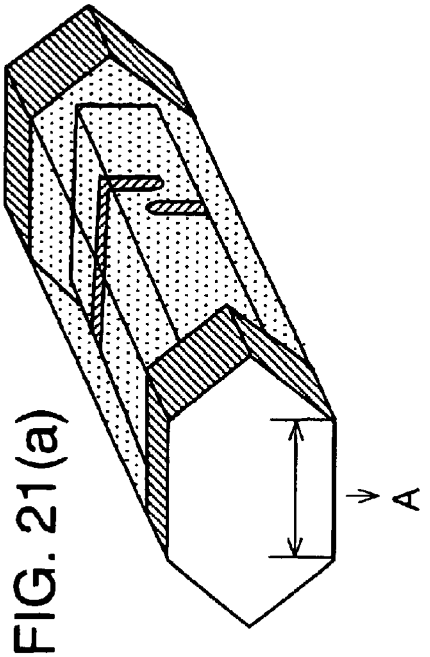
FIG. 21(*a*) is a perspective view of other circuit protector in an exemplary embodiment of the present invention.
Figure 21B:
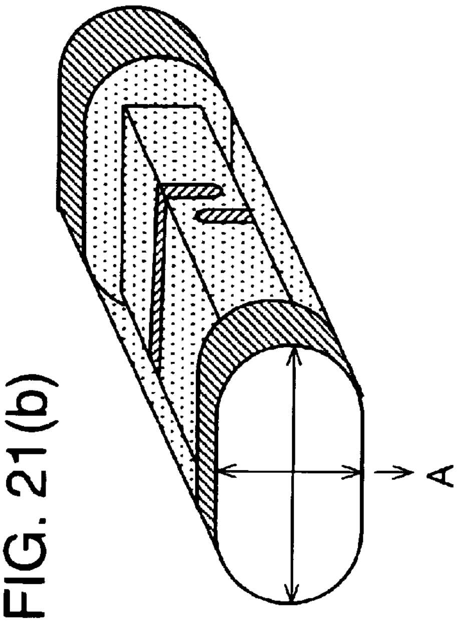
Figure 21C:
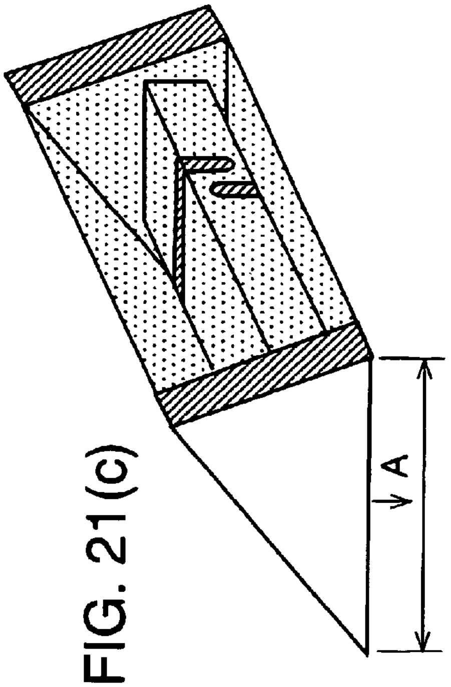
Figure 21D:
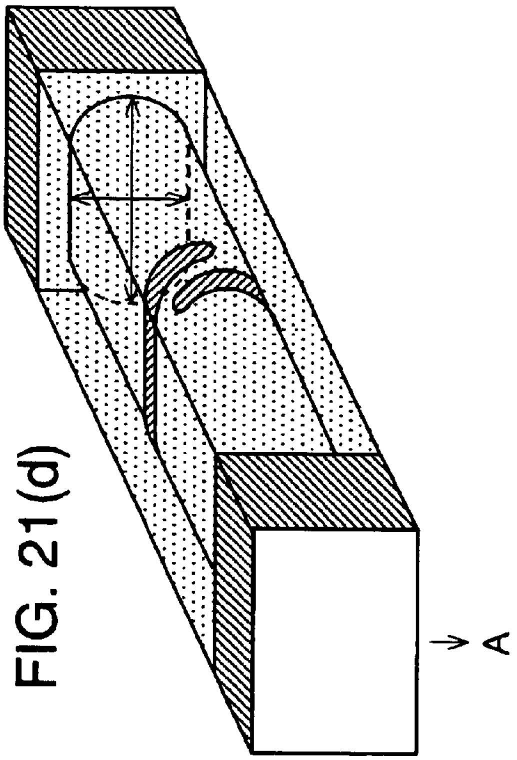

In the present embodiment, the terminals 415, 416 have a rectangular shape in the cross section. Instead, they may take such other shapes as shown in FIG. 20. Namely, as shown in FIG. 20(*a*) and FIG. 21(*a*), the mounting face 415*a*, 416*a*, 415*b*, 416*b* is made to be flat, while a side face 415*c*, 416*c*, 415*d*, 416*d* is provided with at least one or more edges. In the foregoing contour, a circuit protector is hardly mountable on the side face 415*c*, 416*c*, 415*d*, 416*d*.

Referring to FIG. 20(*b*) and FIG. 21(*b*), if cross sectional shape of the terminals 415, 416 is made to have an oval shape, a circuit protector will be mounted in a stable manner on a mounting face 415*a*, 416*a*, 415*b*, 416*b* in parallel with the major axis of the oval. It is hardly possible to mount it on the protruding side face 415*c*, 416*c*, 415*d*, 416*d*.

Furthermore, the terminals 415, 416 may be formed to a shape of an isosceles triangle in the cross section, with the base being shorter than the other two sides as shown in FIG. 20(*c*) and FIG. 21(*c*). The sides 415*a*, 416*a*, 415*b*, 416*b* are made to correspond to the mounting face, while the apex or the base to correspond to the side face 415*c*, 416*c*, 415*d*, 416*d*. By so doing, the mounting face 415*a*, 416*a*, 415*b*, 416*b* can easily be positioned to face to the board.

In the present embodiment, a certain specific face among a plurality of faces in the terminals 415, 416 is poised to be readily taking a position to face a circuit board, and mounted thereon as it is. The narrowed portion 413*a* is disposed on a face that is not parallel (preferably, at substantially right angle) to the certain specific face. In this way, the narrowed portion 413*a* is prevented from being positioned to face the board, and the insulating resistance after the fusion is raised. Namely, since the narrowed portion 413*a* is placed on a side face not facing to the board, the protection material 414 will never be fixed by a flux used during mounting operation. So, the protection material 414 can easily expand at the fusion heat to ensure the fusion at the narrowed portion 413*a*.

In the present embodiment, the middle part 411*b* having the groove 413 has been shaped in a rectangular form, in resemblance with the cross sectional form of the terminals 415, 416, and the narrowed portion 413*a* is disposed in a narrow side face. However, it is also possible to form only the middle part 411*b* in a square in the cross sectional form. The present embodiment offers the same advantage as described in the forgoing, if the narrowed portion is disposed on a side face that is not parallel (crossing at right angle) to the mounting face 415*a*, 516*a*, 415*b*, 416*b*, which being prone to face, or surely face, to the board.

Still further, the middle part 411*b* may be formed in a round pillar as shown in FIG. 21(*d*). In this configuration, the groove 413 can be provided precisely and deviation of the characteristics can be narrowed. The same advantage as the foregoing example is obtained also in the present configuration, by disposing the narrowed portion 413*a* at a place which is not in parallel (crossing at right angle) to the mounting face 415*a*, 516*a*, 415*b*, 416*b*.

Although the substrate 411 of the present embodiment is shaped in a sort of a dumbbell form, where the middle part 411*b* is a step smaller in the whole circumference from the end parts, it may take instead a straight shape without having a shrunk part in the middle part. The simplified shape of substrate 411 contributes to the productivity during production. The substrate 411 may be formed out of, for example, a material of rectangular body.

Although the terminal of the present embodiment has a rectangular shape in a cross section sectioned by a Y Z plane, it may take a polygonal form instead.

Third Embodiment

A third exemplary embodiment of the present invention is described with reference to FIG. 11.

In the present embodiment, the grooves 13*b*, 13*c* are formed around the entire substrate 11; hence, the conductive layer 12 is divided into a portion including the narrowed portion 13*a* and portions including the respective terminals 15, 16. Diffusion of heat generated in the narrowed portion 13*a* can be suppressed most effectively in the present configuration.

The respective portions of conductive layer 12 are coupled by conductive members 110, 111 for electrically connecting the narrowed portion 13*a* and the terminals 15, 16. The conductive member 110, 111 is made of a conductive material in the form of a conductive paste or a stick, a string or a sheet. It is preferable to place the conductive member 110, 111 at a location distant from the narrowed portion 13*a*. In an embodiment shown in FIG. 11, it is placed on a face 102, which is a face other than the face 100 containing the narrowed portion 13*a*. Under this configuration, heat conduction via the conductive member 110, 111 can be further suppressed. Especially preferred place for the conductive member is the face 102, which is locating opposite to the face 100 containing the narrowed portion 13.

Figure 11:
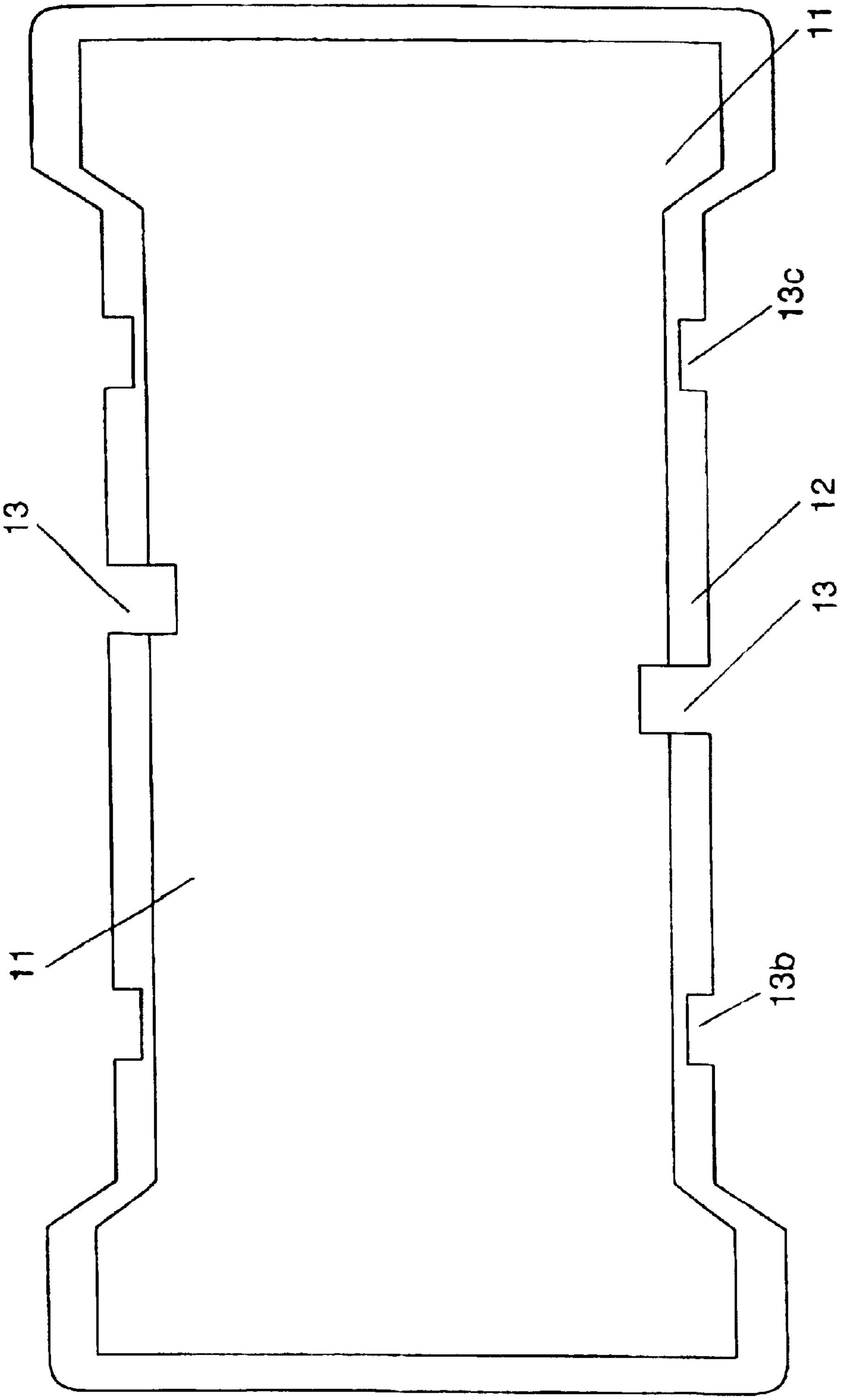
FIG. 11 is a perspective view of other circuit protector in accordance with an exemplary embodiment of the present invention.

In the embodiment of FIG. 11, the grooves 13*b*, 13*c* have been provided splitting a conductive layer 12. In some cases, provision of the grooves 13*b*, 13*c* results in a significantly raised electrical resistance with the conductive layer 12. Even in such a case, the conductive member 110, 111 contributes to prevent the increase in electrical resistance of the circuit protector.

In the present configuration, there is a possibility that a foreign staff within the groove 13*b*, 13*c* may impair the expected characteristics. A preferred precaution against such trouble is to fill the grooves 13*b*, 13*c* with a certain material whose thermal conductivity is lower than that of the conductive layer 12. A suitable material for the purpose is an organic material such as a several kinds of resist, a silicone resin or the like materials.

As described above, the grooves 13*b*, 13*c* remarkably suppress the dissipation of heat generated from the narrowed portion 13*a* towards the terminals 15, 16. This shortens pre-arcing time of a circuit protector. Other advantage of the present configuration is a reduction of resistance of a circuit protector, which may increase by the provision of the grooves 13*b*, 13*c*. Namely, a conductive member 110, 111 disposed on the conductive layer 12 bridging the groove 13*b*, 13*c* contributes to reduce and to narrow the deviation in the resistance of circuit protectors. The groove may be provided for only one groove, also in the present embodiment.

What is claimed is:

1. A circuit protector comprising:

a substrate having a surface;

a conductive layer around said substrate;

a narrowed portion in a part of said conductive layer;

a terminal at both ends of said substrate;

wherein said substrate has a pore area of 1–30% per unit surface area of the surface of said substrate and vicinity of the surface of said substrate, said percentage of pore area defined as a proportion of pores appearing on a polished surface per unit area.

2. The circuit protector of claim 1, wherein said conductive layer is a laminated structure with copper or its alloy laminated on top layer.

3. The circuit protector of claim 1, wherein said substrate is one of a polygonal pillar, an elliptic pillar and a round pillar.

4. The circuit protector of claim 1, wherein said substrate is a square pillar, and a groove is formed on at least one face containing said narrowed portion.

5. The circuit protector of claim 1, wherein said substrate has a stepped lower level in the middle portion between said ends, and said narrowed portion is formed in said middle portion.

6. The circuit protector of claim 1, wherein said substrate is provided with a groove formed in a helical shape, and said narrowed portion is formed at the vicinity of both ends of said groove.

7. The circuit protector of claim 1, wherein said groove has a width of 6 μm–45 μm.

8. The circuit protector of claim 1, wherein said narrowed portion has a width of 10 μm–40 μm.

9. The circuit protector of claim 1 further comprising a fusion accelerator provided on said narrowed portion.

10. The circuit protector of claim 1 further comprising a protection material covering at least said narrowed portion.

11. The circuit protector of claim 1 further comprising a protection material covering said groove.

12. The circuit protector of claim 1 meeting dimensional requirements specified below;

L1=0.5–2.2 mm

L2=0.2–1.3 mm

L3=0.2–1.3 mm where, L1 is an overall length, L2 a width, and L3 a height of the circuit protector.

13. The circuit protector of claim 1, wherein said substrate has a surface roughness of 0.15 μm–0.8 μm, where the surface roughness is a center line average roughness specified in JIS B0601.

14. The circuit protector of claim 1, wherein a cross sectional shape of the terminals is polygonal and a mounting face to a circuit board is one face of the terminal other than one face that contains the shortest side of said polygon.

15. The circuit protector of claim 14, wherein said narrowed portion is disposed on a face that is not opposing to said circuit board, when the circuit protector is mounted thereon.

16. The circuit protector of claim 14, wherein said polygonal shape is a rectangle, and a face containing the longer side opposes to said circuit board, when the circuit protector is mounted thereon.

17. The circuit protector of claim 16 meeting the dimensional requirements specified below, $0.40<(L2\div L3)<0.90$ where, L3 is a width of longer side of said rectangle, L2 a width of shorter side of said rectangle.

18. The circuit protector of claim 1, wherein a cross sectional shape of said terminal is elliptic, and a face parallel to the major axis of said elliptic shape opposes to a circuit board, when the circuit protector is mounted thereon.

19. The circuit protector of claim 18, wherein said narrowed portion is disposed on a place that is not opposing to said circuit board, when the circuit protector is mounted thereon.

20. The circuit protector of claim 1, wherein said conductive layer is provided with a groove in a location between said narrowed portion and one of said terminals, and a groove in a location between said narrowed portion and another one of said terminals, at least one of said grooves is extending around the substrate surface and said at least one groove is bridged at a part by a conductive member for electrical conduction.

21. The circuit protector of claim 20, wherein said conductive member is either one selected from the group consisting of a conductive paste, a solder and an electroconductive material in a stick, wire or sheet form.

22. The circuit protector of claim 1, wherein said conductive layer is provided with a groove in a location between said narrowed portion and one of said terminals, and a groove in a location between said narrowed portion and the other one of said terminals, the grooves are extending around the substrate surface and each of said two grooves is bridged at a part by a conductive member for electrical conduction.

23. The circuit protector of claim 22, wherein said conductive member is either one selected from the group consisting of a conductive paste, a solder and an electroconductive material in a stick, wire or sheet form.

24. A mounting structure of a circuit protector having a fusing section onto a circuit board, wherein said fusing section is not opposite to said circuit board, when a circuit protector is mounted thereon.

25. The mounting structure of a circuit protector of claim 24, said circuit protector comprising:

a substrate, a conductive layer formed around said substrate, a narrowed portion formed in a part of said conductive layer, and a terminal formed at both ends of said substrate.

26. The mounting structure of a circuit protector of claim 24, wherein said fusing section is positioned at substantially right angles to said circuit board.

27. The mounting structure of a circuit protector of claim 25, wherein said terminal has a rectangular shape in the cross section, and a face having a longer side opposes to the circuit board, when the circuit protector is mounted thereon, while a face having the shorter side stands as side face.

28. The mounting structure of a circuit protector of claim 25, wherein said conductive layer is provided with a groove in a location between said narrowed portion and one of said terminals, and a groove in a location between said narrowed portion and another one of said terminals, at least one of said grooves is extending around the substrate and said at least one groove is bridged at a part by a conductive member for electrical conduction.

* * * * *